(12) United States Patent
Nakashima

(10) Patent No.: US 10,207,675 B2
(45) Date of Patent: Feb. 19, 2019

(54) VEHICLE KEYLESS SYSTEM AND ON-VEHICLE DEVICE OF VEHICLE KEYLESS SYSTEM

(71) Applicant: Calsonic Kansei Corporation, Saitama (JP)

(72) Inventor: Yuuki Nakashima, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 16/069,014

(22) PCT Filed: Mar. 3, 2017

(86) PCT No.: PCT/JP2017/008453
§ 371 (c)(1),
(2) Date: Jul. 10, 2018

(87) PCT Pub. No.: WO2017/159399
PCT Pub. Date: Sep. 21, 2017

(65) Prior Publication Data
US 2019/0016299 A1    Jan. 17, 2019

(30) Foreign Application Priority Data
Mar. 18, 2016  (JP) .................................. 2016-054677

(51) Int. Cl.
*G06F 9/44* (2018.01)
*H04L 29/08* (2006.01)
(Continued)

(52) U.S. Cl.
CPC .............. *B60R 25/01* (2013.01); *B60R 25/20* (2013.01); *E05B 81/56* (2013.01)

(58) Field of Classification Search
USPC ....................................................... 340/5.64
See application file for complete search history.

(56) References Cited

U.S. PATENT DOCUMENTS

| 2003/0002537 A1* | 1/2003 | Schaller | H04J 3/0685 370/503 |
| 2003/0028756 A1* | 2/2003 | Panis | G06F 9/30116 712/225 |
| 2014/0214967 A1* | 7/2014 | Baba | H04H 20/08 709/205 |

FOREIGN PATENT DOCUMENTS

| JP | 2002-026760 | 1/2002 |
| JP | 2009-127244 | 6/2009 |

(Continued)

OTHER PUBLICATIONS

International Search Report issued in International Application No. PCT/JP2017/008453 dated May 23, 2017 (3 pages).
(Continued)

*Primary Examiner* — Yong Hang Jiang
(74) *Attorney, Agent, or Firm* — Hamre, Schumann, Mueller & Larson, P.C.

(57) ABSTRACT

At acquisition of a first unit command signal RC(1) of which storage is completed and in a case that the ring buffer stores a part of a second unit command signal RC(2), the CPU acquires the first unit command signal and the part of the second unit command signal upon receiving a first interrupt signal BQ(1), and then separates the first unit command signal and the part of the second unit command signal from each other. When having received a second interrupt signal BQ(2), the CPU acquires the remaining of the second unit command signal, and combines the remaining of the second unit command signal and the part of the second unit command signal. Accordingly, the second unit command signal once separated is acquired as a signal having all data completed.

12 Claims, 15 Drawing Sheets

(51) Int. Cl.
*B60R 25/01* (2013.01)
*B60R 25/20* (2013.01)
*E05B 81/56* (2014.01)

(56) References Cited

FOREIGN PATENT DOCUMENTS

| | | |
|---|---|---|
| JP | 2010-136270 | 6/2010 |
| JP | 2010-222810 | 10/2010 |

OTHER PUBLICATIONS

Written Opinion issued in International Application No. PCT/JP2017/008453 dated May 23, 2017 (3 pages).

* cited by examiner

VEHICLE KEYLESS SYSTEM AND ON-VEHICLE DEVICE OF VEHICLE KEYLESS SYSTEM

TECHNICAL FIELD

The present invention relates to a vehicle keyless system in which wireless communication is performed between a portable device operated by a person and an on-vehicle device mounted on a vehicle so that, for example, a predetermined command of vehicle door locking and unlocking is executed, and also relates to the on-vehicle device of the vehicle keyless system.

BACKGROUND ART

Recently, vehicle keyless systems have been widely used. For example, Japanese Patent Laid-open No. 2009-127244 proposes improvement to the convenience of such systems.

Conventionally, communication between a portable device and an on-vehicle device in such a vehicle keyless system has redundancy for improving communication accuracy by including a plurality of unit command signals intermittently transmitted at a predetermined time interval in a command signal transmitted from the portable device.

The on-vehicle device includes a reception unit, a target actuator of the command, and a CPU or the like as a control unit configured to control these components.

When having acquired any one of unit command signals received by the reception unit, the control unit of the on-vehicle device can execute a command by performing code analysis on the signal. To achieve accuracy improvement, however, the control unit preferably acquires all transmitted unit command signals.

To achieve this, in the on-vehicle device, the reception unit sequentially and temporarily stores each received unit command signal in a predetermined memory and transmits an interrupt signal to the control unit, and then the control unit acquires the unit command signal from the memory through acquisition communication in a constant time.

CITATION LIST

Patent Literature

Patent Literature 1: Japanese Patent Laid-open No. 2009-127244

SUMMARY OF INVENTION

Technical Problem

The control unit (CPU) is in a sleep state until reception of the interrupt signal for the first time, and takes a predetermined time to transition to an operational state.

The time interval between unit command signals has to be restricted in view of necessity of maintaining the response performance of the keyless system. Specifically, while the reception unit receives the first unit command signal and transmits the interrupt signal to the control unit and the control unit transitions from the sleep state to the operational state, the reception unit starts reception of the second unit command signal and storing the signal in the memory.

Thus, when the control unit has transitioned to the operational state and acquires data from the memory through acquisition communication in a constant time, the control unit acquires data including the first unit command signal and a part of the second unit command signal.

Accordingly, the control unit cannot acquire the second unit command signal as complete data by merely acquiring all data in the memory because data of the second unit command signal is not completed.

The acquisition of a unit command signal means that data of the signal is acquired in a state that all data is completed without any lack due to division or the like so as to enable code analysis extracting, for example, ID information and command information.

The incomplete acquisition leads to loss of communication accuracy improvement achieved by added redundancy.

The present invention is intended to solve the above-described problem by providing a vehicle keyless system and an on-vehicle device of the vehicle keyless system in which a control unit of the on-vehicle device is capable of acquiring all unit command signals so that high communication accuracy is achieved.

Solution to Problem

A vehicle keyless system according to the present invention includes a portable device configured to transmit a command signal; and an on-vehicle device configured to receive the command signal transmitted from the portable device and control an on-vehicle component in response to the command signal as received. In the on-vehicle device, a reception unit receives a unit command signal, stores received unit command signals in the ring buffer in an order of reception, and outputs an interrupt signal to the on-vehicle-side control unit at each time when the reception unit completes storage of the received unit command signal in the ring buffer.

The control unit controls an execution timing of acquisition and an amount of acquisition when the on-vehicle-side control unit acquires a target unit command from the ring buffer and in a case that the ring buffer stores at least a part of a unit command signal as received by the reception unit subsequent to the target unit command signal, so that the unit command signal as received subsequent to the target unit command signal is acquired in a state that all data is completed.

Advantageous Effects of Invention

According to the present invention, when the on-vehicle-side control unit acquires a target unit command of which storage in the ring buffer has been completed and in a case that the ring buffer is storing at least a part of a unit command signal as received by a reception unit subsequent to a target unit command signal, a control unit of an on-vehicle device performs appropriate control such as shift or division of the timing of acquisition, or adjustment of acquisition amount of data from the ring buffer at each timing. Accordingly, the unit command signal as received subsequent to the target unit command signal can be reliably acquired in a state that all data is completed, which leads to high communication accuracy.

DESCRIPTION OF EMBODIMENT

In a vehicle keyless system, control of various kinds of on-vehicle components can be a command target.

The following description will be made on an example with a keyless entry system in which locking and unlocking of a door is a main command target.

Figure 1:
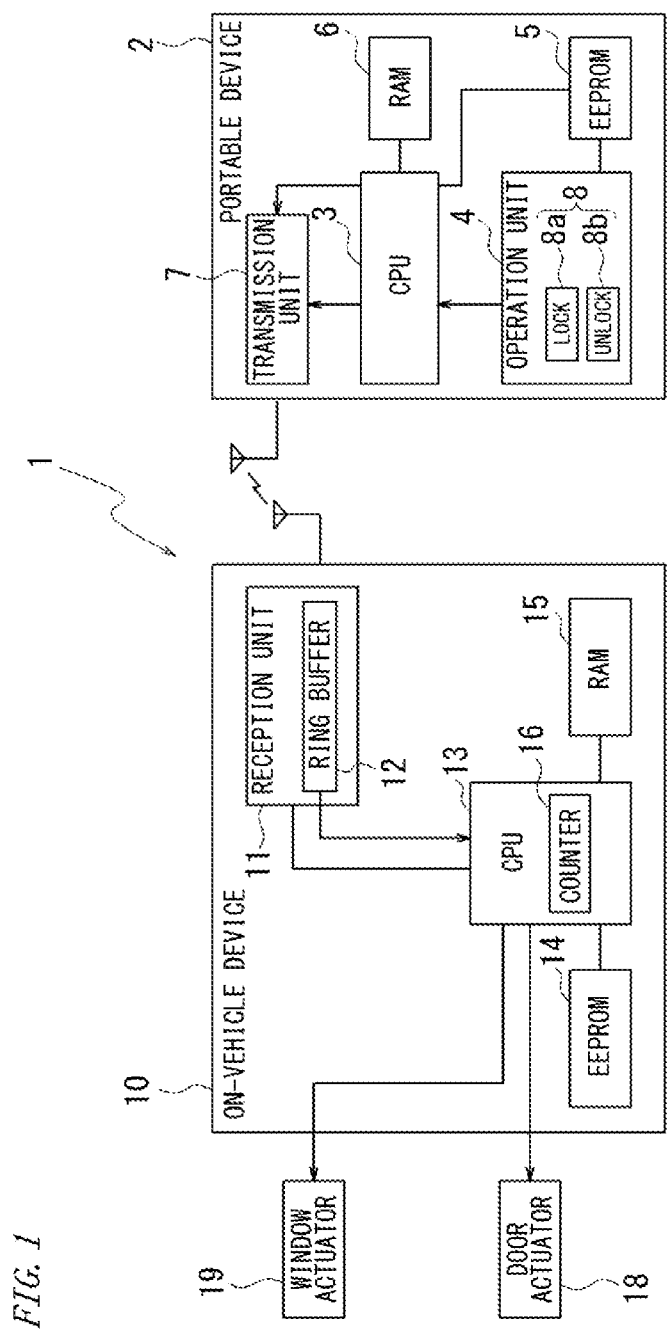
FIG. 1 is a block diagram illustrating the entire configuration of a keyless entry system.

FIG. 1 is a block diagram illustrating the entire configuration of a keyless entry system 1 (vehicle keyless system).

The keyless entry system 1 includes a portable device 2 that a person using a vehicle (hereinafter also referred to as a user) is carrying, and an on-vehicle device 10 mounted on the vehicle.

When having received a command signal from the portable device 2, the on-vehicle device 10 outputs a drive signal based on the received command signal to, for example, a door actuator 18 configured to lock and unlock any door of the vehicle, or to a window actuator 19 configured to open and close any door window.

The portable device 2 mainly includes a CPU 3 as a control unit, an operation unit 4, an EEPROM 5, a RAM 6, and a transmission unit 7.

The operation unit 4 includes a key button 8 operated by the user, and the key buttons 8 of the portable device 2 are a lock button 8a and an unlock button 8b. In the following description, for the convenience of description, the lock button 8a and the unlock button 8b are referred to as the key buttons 8 when not distinguished from each other.

The EEPROM 5 stores a processing program for executing operation of CPU 3, and ID (identification) information.

The CPU 3 performs processing of generating a command signal based on an operation on the key button 8, and outputs the generated command signal to the transmission unit 7.

The RAM 6 temporarily stores data and the like while processing is performed by the CPU 3.

The transmission unit 7 includes an oscillation circuit and a modulation circuit (not illustrated), and transmits, as radio wave, a command signal generated by the CPU 3.

The on-vehicle device 10 mainly includes a reception unit 11, a CPU 13 as a control unit, an EEPROM 14, and a RAM 15.

The reception unit 11 receives a command signal transmitted from the portable device 2. The reception unit 11 includes a ring buffer 12 as a memory configured to sequentially and temporarily store command signals, and stores data of the received command signal in the ring buffer 12. The sequentially stored data can be taken out from the ring buffer 12 allows in a time sequential, and the ring buffer 12 is capable of storing at least two unit command signals described later.

The CPU 13 includes a counter 16 described later.

The EEPROM 14 stores a processing program for operating the CPU 13, and ID information.

The RAM 15 temporarily stores data and the like while processing is performed by the CPU 13.

The CPU 13 acquires a command signal stored in the ring buffer 12 through acquisition communication in a SPI (serial peripheral interface) mode, and performs matching processing, command processing, or the like based on the command signal.

Then, the CPU 13 outputs a command instruction such as a drive signal to the door actuator 18 or the window actuator 19 based on the matching processing, the command processing, or the like.

The CPU 13 also performs an entire control of the on-vehicle device 10 including the reception unit 11.

Although not illustrated, the on-vehicle device 10 includes, between the CPU 13 and each of the door actuator 18 and the window actuator 19, an interface for transmitting the command instruction.

Next, an outline of operation of the keyless entry system 1 will be described with reference to FIG. 2.

Figure 2:
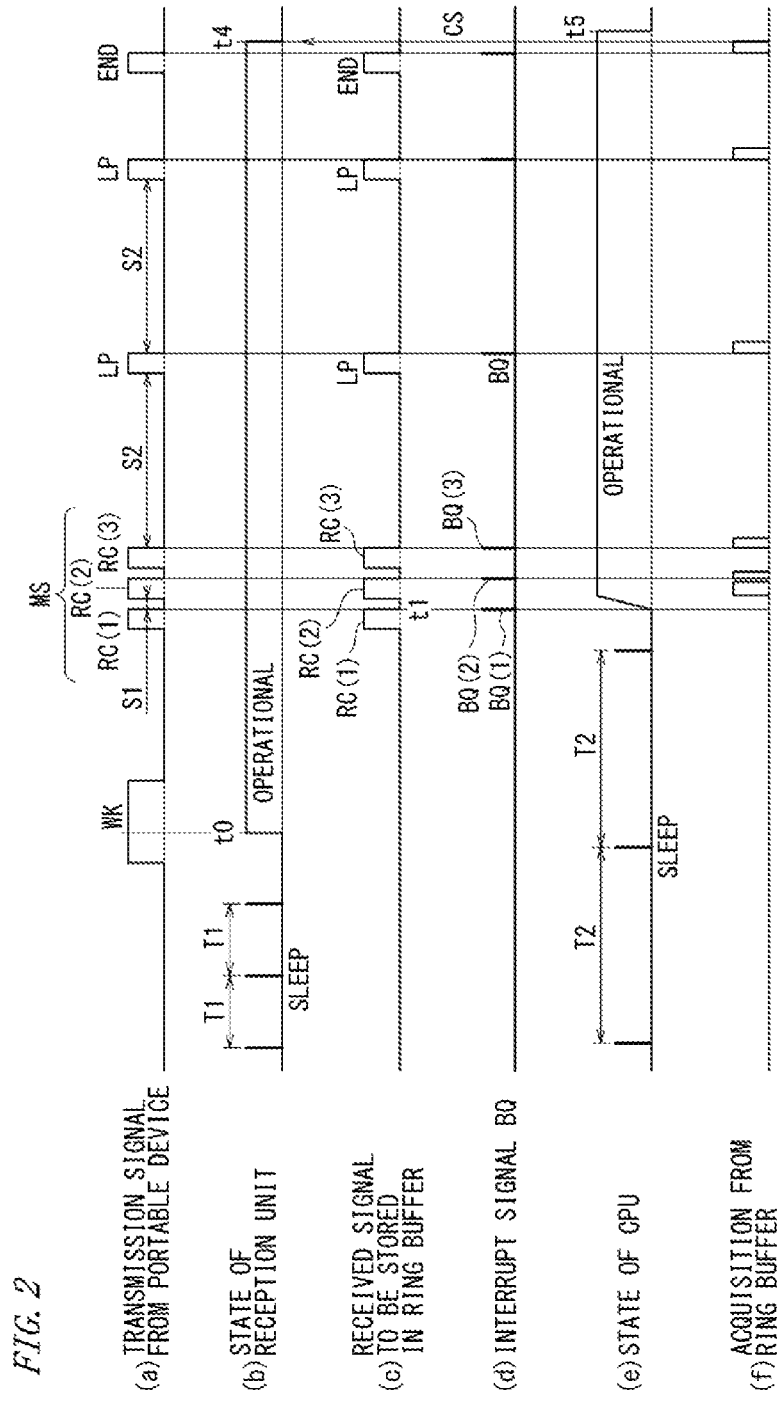
FIG. 2 is a time chart illustrating operation at an on-vehicle device.

When the user presses down the key button 8 of the portable device 2, signals illustrated in (a) of FIG. 2 is transmitted from the portable device 2 to the on-vehicle device 10.

The signals are a wake-up signal WK for activating the reception unit 11, a main signal MS (unit command signal RC) for the CPU 13 to execute command processing in response to the pressed key button 8, and an end signal END indicating completion of signal transmission, which are transmitted in a time sequential manner.

In an embodiment, operations of the key button 8 include an operation (first operation) of simply pressing down the key button 8 and a special operation (second operation) of pressing the key button 8 for a long time.

When the user presses down the key button 8 of the portable device 2 a long time (when the second operation is performed), the above-described signals further includes sub signals LP between the unit command signal RC and the end signal END, as illustrated in (a) of FIG. 2.

The unit command signal RC includes a plurality of unit command signals RC. In the embodiment, three unit command signals RC (RC(1), RC(2), and RC(3)) are transmitted at a predetermined time interval (first time interval S1) such as 5 ms.

The unit command signal RC includes ID information uniquely allocated to the portable device 2, and code data indicating a command information corresponding to the pressed key button 8 (the lock button 8a or the unlock button 8b). The unit command signals RC (RC(1), RC(2), and RC(3)) generated when the key button 8 is pressed have identical contents.

In the following description, the three unit command signals RC(1), RC(2), and RC(3) are also collectively referred to as the main signal MS.

The special operation (second operation) as described above will be explained.

For example, when the operation (first operation) of simply pressing down the unlock button 8b is performed, each unit command signal RC generated due to the first operation includes command information requesting door unlock.

When the special operation (second operation) of pressing the unlock button 8b for a long time is performed, each unit command signal RC generated due to the second operation includes, for example, command information for opening a door window.

In the embodiment, the on-vehicle device 10 needs to be capable of confirming that the unlock button 8b is pressed for a long time. Thus, while the key button 8 is continued to be pressed, a unit command signal (RC) identical to the main signal MS is transmitted as a sub signal after the main signal MS at a second time interval S2 that is longer than the first time interval S1.

In the following description, the unit command signal transmitted at the second time interval S2 is referred to as the sub signal LP and distinguished from the main signal MS.

When the operation of pressing down the key button 8 ends, the end signal END including the ID information is transmitted from the transmission unit 7.

It should be noted that a data length of the unit command signal RC is set in advance and stored in the EEPROM 14 of the on-vehicle device 10.

As illustrated in (a) and (b) of FIG. 2, the reception unit 11 of the on-vehicle device 10 is intermittently activated in a sleep state until reception of the wake-up signal WK from the portable device 2.

When having received the wake-up signal WK at an operation timing, the reception unit 11 transitions to an operational state from the sleep state, being capable of constantly receiving the main signal MS and the like that is transmitted from the portable device 2.

Thus, the wake-up signal WK has a length set to be larger than an intermittent interval T1 at the intermittent operation of the reception unit 11 ((a) and (b) of FIG. 2).

The intermittent interval T1 at the intermittent operation of the reception unit 11 has an operation timing set to be a value for avoiding overlapping with the sub signal LP.

The operation of the keyless entry system 1 will be described below in detail with examples.

EXAMPLE 1

FIG. 2 is a time chart of operation at the on-vehicle device 10 according to a first example. FIG. 2 illustrates, in (a), arrival signals from the portable device 2 (transmission signal from the portable device) to the reception unit 11. FIG. 2 illustrates, in (b), state transition of the reception unit 11. FIG. 2 illustrates, in (c), received signals that are stored in the ring buffer 12 by the reception unit 11. FIG. 2 illustrates, in (d), interrupt signals BQ output from the reception unit 11.

Note that FIG. 2 illustrates a state in which the end signal END is received after the two sub signals LP are received.

The reception unit 11 receives the wake-up signal WK illustrated in (a) of FIG. 2 and transitions to the operational state at time point t0 as illustrated in (b) of FIG. 2. Thereafter, the reception unit 11 sequentially stores data of received signals such as the unit command signal RC in the ring buffer 12 in a time sequential manner as illustrated in (c) of FIG. 2.

Then, at each time when the reception unit completes the storage of each received signal, the reception unit 11 outputs the interrupt signal BQ to the CPU 13 as illustrated in (d) of FIG. 2. This outputting of the interrupt signal BQ is similar both for the main signal MS and the sub signal LP.

FIG. 2 illustrates, in (e), state transition of the CPU 13.

Once the first unit command signal RC(1) of the main signal MS is stored in the ring buffer 12, the first interrupt signal BQ(1) (for the first time) is input to the CPU 13 at time point t1 when the storage is completed. Accordingly, the state of the CPU 13 transitions to the operational state from the sleep state of intermittent activation.

At each time when the CPU receives the interrupt signal BQ during the operational state, the CPU 13 acquires received signals stored in the ring buffer 12 of the reception unit 11 through acquisition communication.

FIG. 2 illustrates, in (f), acquisition communication timings, but the detail thereof as well as (e) of FIG. 2 will be described later with reference to FIG. 2 FIG. 3.

The CPU 13 stores the acquired received signal in the RAM 15, and the CPU 13 also performs code analysis on the received signal to extract ID information and command information and stores analysis results in the RAM 15.

Figure 3:
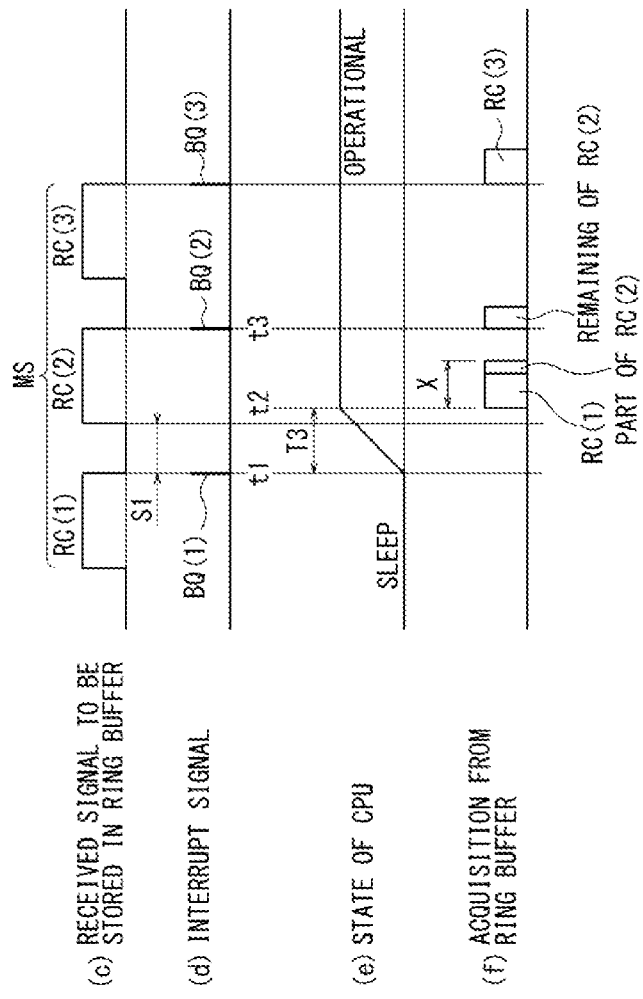
FIG. 3 is an enlarged time chart illustrating a main part of FIG. 2 according to a first example.

FIG. 3 is a time chart illustrating a main part of the main signal MS (unit command signals RC(1) to RC(3)) portion of FIG. 2 with an enlarged time axis.

FIG. 3 illustrates, in (c), received signals stored in the ring buffer 12. FIG. 3 illustrates, in (d), interrupt signals BQ. FIG. 3 illustrates, in (e), state transition of the CPU 13.

FIG. 3 illustrates, in (f), acquisition timings from the ring buffer 12.

When the storage of the first unit command signal RC(1) in the ring buffer 12 is completed, the CPU 13 receives the first interrupt signal BQ(1) upon the storage completion, and transitions from the sleep state to the operational state.

However, the state transition of the CPU 13 from the sleep state to the operational state takes time, and thus a transition delay T3 of, for example, about 6 ms occurs until the acquisition communication from the ring buffer 12 becomes possible as illustrated in (e) of FIG. 3.

For this reason, when the CPU 13 acquires, in response to the first interrupt signal BQ(1), the first unit command signal RC(1) stored in the ring buffer 12, the start of this acquisition communication is delayed until time point t2.

Thus, as illustrated in (c) and (f) of FIG. 3, when the reception unit 11 receives the second unit command signal RC(2) between time point t1 at which the interrupt signal BQ(1) is received and time point t2 at which the acquisition communication is started, the reception unit 11 starts to store the received second unit command signal RC(2) in the ring buffer 12.

When the storage of the second unit command signal RC(2) in the ring buffer 12 is completed, the second interrupt signal BQ(2) is input to the CPU 13. In this case, the CPU 13 is already in the operational state at timing (time point t3) at which the second interrupt signal BQ(2) is received. Accordingly, the acquisition communication from the ring buffer 12 is immediately executed without causing the transition delay problem described above.

Furthermore, the acquisition communication from the ring buffer 12 upon receiving the third interrupt signal BQ(3)

is also immediately executed without causing the transition delay problem described above.

In the present example, when executing the acquisition communication, the CPU 13 acquires all data stored in the ring buffer 12 within an acquisition communication time period X set in advance, as illustrated in (f) of FIG. 3.

However, as illustrated in FIG. 3, the storage of the second unit command signal RC(2) in the ring buffer 12 is not entirely completed by the end of the set acquisition communication time period X. Thus, data acquired by the CPU 13 is continuously combined date of the first unit command signal RC(1) and a part of the second unit command signal RC(2).

Note that the width of each unit command signal in (f) of FIG. 3 is an image illustrating volume ratio of acquired data, but not indicating its time length.

The CPU 13 acquires each unit command signal RC from the acquired data as follows.

First, since the data length of the unit command signal RC is known, the CPU 13 identifies and separates the first unit command signal RC(1) and the part of the second unit command signal RC(2) based on the known data length.

Accordingly, the first unit command signal RC(1) is acquired in a state that all data necessary for code analysis is completed.

Then, the CPU 13 acquires the remaining of the second unit command signal RC(2) from the ring buffer 12 in response to the second interrupt signal BQ(2) at time point t3 when the storage of the second unit command signal RC(2) in the ring buffer 12 is completed.

Then, the CPU 13 combines thus acquired remaining of the second unit command signal RC(2) with the part of the second unit command signal RC(2) separated before, thereby acquiring the second unit command signal RC(2) in a state that all data necessary for code analysis is completed.

As for the third unit command signal RC(3), the CPU 13 executes the acquisition communication in response to the third interrupt signal BQ(3) when storage of the third unit command signal RC(3) in the ring buffer 12 is completed. Accordingly, the third unit command signal RC(3) in a state that all data necessary for code analysis is completed is acquired by the CPU 13 without data division.

Then, the CPU 13 extracts ID information and command information through code analysis on the acquired unit command signal RC.

Then, in a case that the extracted ID information matches with ID information stored in the EEPROM 14 and all signals are identical, the CPU 13 performs first command processing based on the command information of the unit command signal RC. Accordingly, for example, a command instruction is output to the door actuator 18.

The command instruction is, for example, a door unlock command when the unlock button 8b is pressed at the portable device 2, or a door lock command when the lock button 8a is pressed at the portable device 2.

As returned to the time chart illustrated in FIG. 2, when the reception unit 11 receives the sub signal LP during the operational state after the reception of the main signal MS, the reception unit 11 stores the received sub signal LP in the ring buffer 12.

Accordingly, the interrupt signal BQ due to completion of the storage of the sub signal LP in the ring buffer 12 is input to the CPU 13. When the sub signal LP is received a plurality of times, the interrupt signal BQ due to completion of the storage of the sub signal LP in the ring buffer 12 is input to the CPU 13 at each reception.

Thus, the CPU 13 acquires the sub signal LP from the ring buffer 12 at each time when the interrupt signal BQ is input.

The CPU 13 includes the counter 16 configured to count the number of acquired sub signals LP (the number of times of the acquisition), and determines whether the number of acquired sub signals LP has reached a predetermined number N set in advance.

When the CPU determines that the number of acquired sub signals LP has reached the predetermined number N, the CPU 13 determines that the special operation of pressing the key button 8 for a long time is performed, and performs second command processing. For example, a command instruction (command to move a side glass in the opening direction) is output to the window actuator 19.

Figure 4:
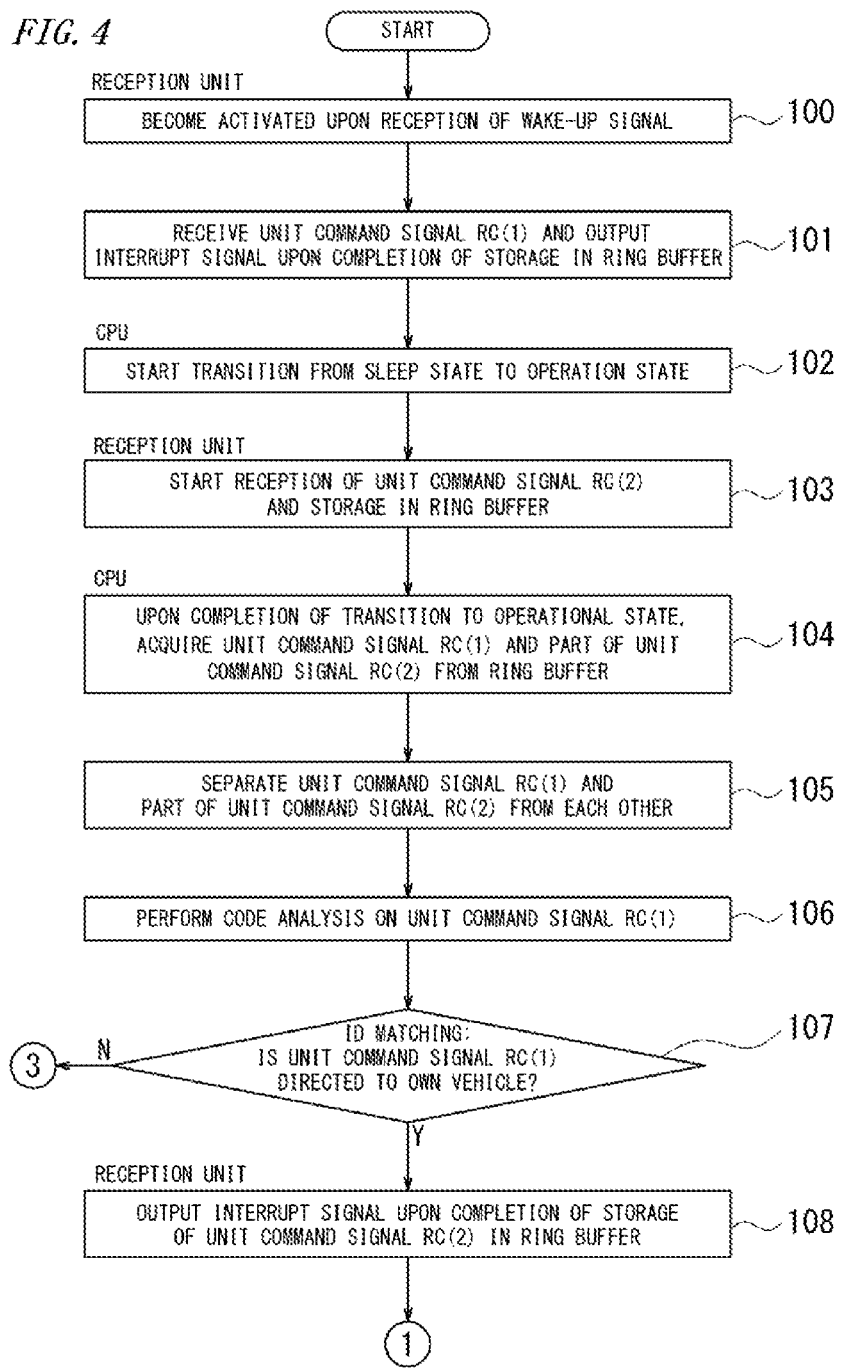
FIG. 4 is a flowchart illustrating process flow at the on-vehicle device according to the first example.
Figure 5:
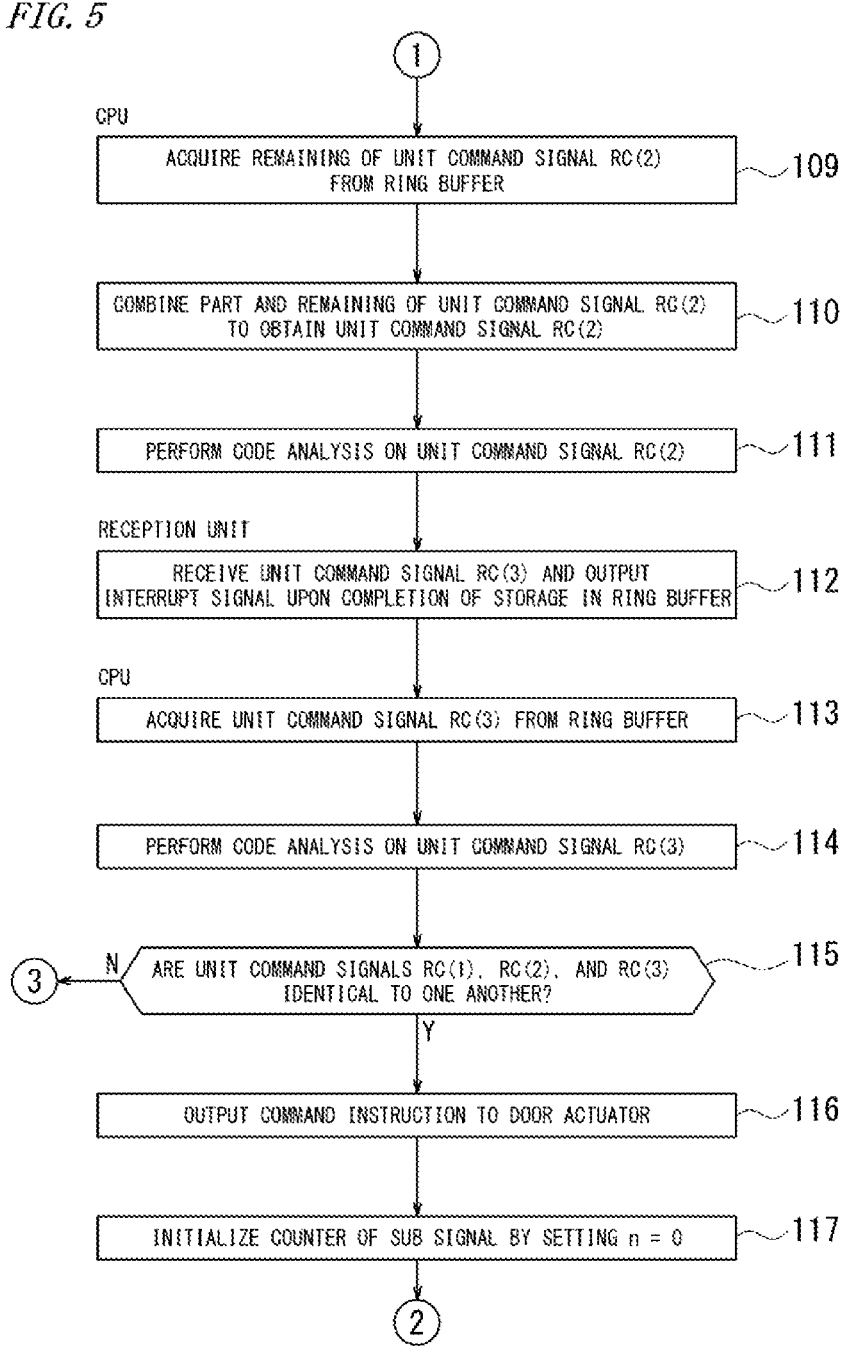
FIG. 5 is a flowchart illustrating the process of the processing at the on-vehicle device according to the first example.
Figure 6:
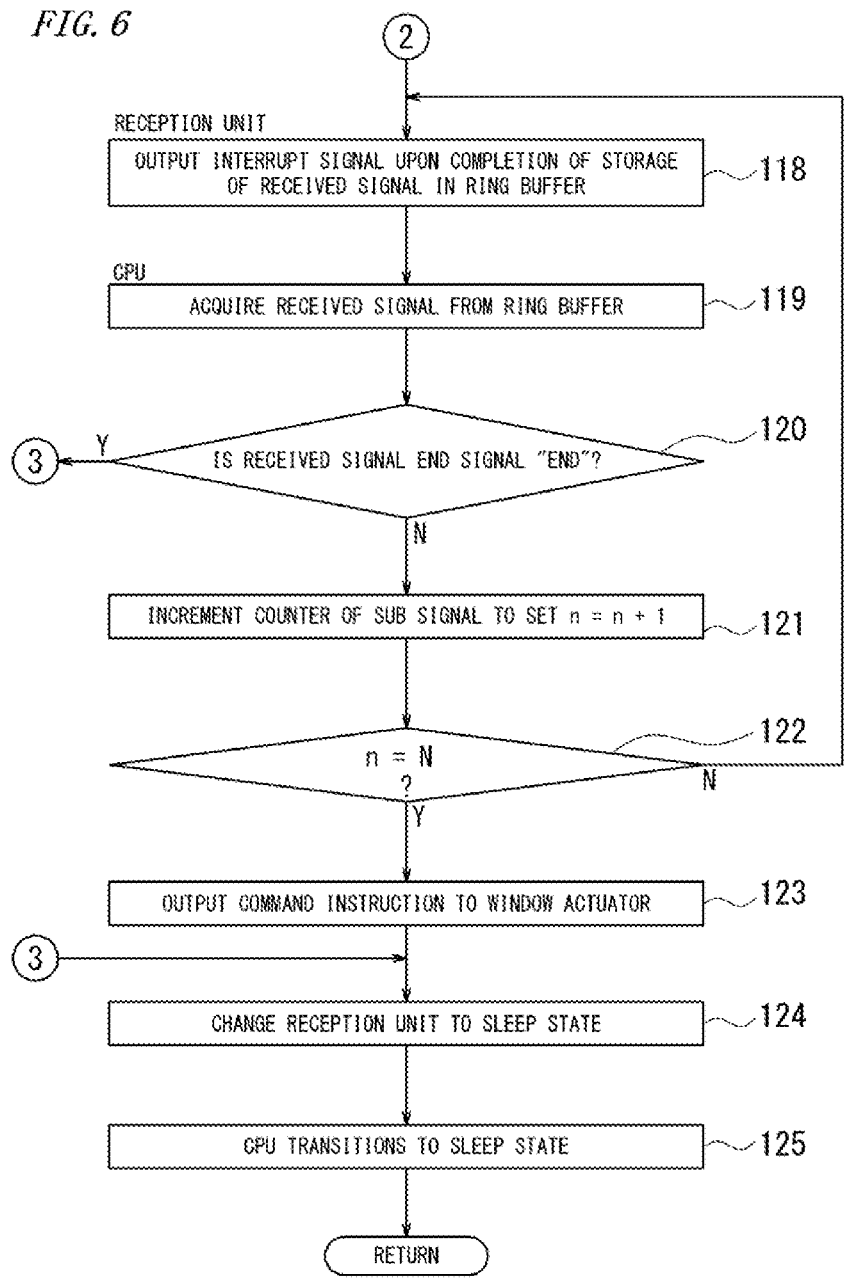
FIG. 6 is a flowchart illustrating the process of the processing at the on-vehicle device according to the first example.

FIGS. 4 to 6 are each a flowchart illustrating process flow at the on-vehicle device 10 according to the first example.

In the flowchart, each step indicates on the upper left side the unit mainly performing its process, though the indication is omitted for steps of which process is performed by the unit identical to that of the previous step. The same is applied to a flowchart according to other examples.

First, the reception unit 11 and the CPU 13 of the on-vehicle device 10 are in the sleep state of the intermittent activation while no signal is transmitted from the portable device 2.

At step 100, when the reception unit 11 is activated upon reception of the wake-up signal WK from the portable device 2, the state of the reception unit 11 is transitioned from the sleep state to the operational state.

Then at step 101, when the reception unit 11 receives the first unit command signal RC(1) following the wake-up signal WK and completes the storage of the received first unit command signal RC(1) in the ring buffer 12, the reception unit 11 outputs the first interrupt signal BQ(1) to the CPU 13.

At step 102, the CPU 13 receives the first interrupt signal BQ(1), and starts transition processing from the sleep state to the operational state.

During the transition delay T3 from the sleep state to the operational state, at step 103, the reception unit 11 starts reception of the second unit command signal RC(2) and storing the received second unit command signal RC(2) in the ring buffer 12.

When the transition processing started at step 102 is completed, at step 104, the CPU 13 in the operational state acquires the first unit command signal RC(1) and a part of the second unit command signal RC(2) stored in the ring buffer 12.

Subsequently at step 105, the CPU 13 separates the first unit command signal RC(1) from the part of the second unit command signal RC(2).

Then at step 106, the CPU performs code analysis on the separated first unit command signal RC(1) and acquires, for example, ID information and command information.

When the code analysis is completed, at step 107, the CPU 13 performs, based on a result of the code analysis, matching between the ID information acquired from the unit command signal RC(1) and ID information stored in the EEPROM 14.

Then, the CPU 13 proceeds to step 108 when the CPU 13 determines, based on the result of the matching, that the unit command signal RC(1) from which the ID information is acquired is directed to the own vehicle ("Y" at step 107). The CPU 13 proceeds to step 124 when the CPU 13 determines that the unit command signal RC(1) is not directed to the own vehicle ("N" at step 107).

At step 108, when the reception unit 11 completes the storage of the second unit command signal RC(2) in the ring buffer 12, the reception unit 11 outputs the second interrupt signal BQ(2) to the CPU 13.

At step 109, the CPU 13, having received the second interrupt signal BQ(2), acquires the remaining data of the second unit command signal RC(2) stored in the ring buffer 12.

Then at step 110, the CPU 13 combines the part of the second unit command signal RC(2), which is separated at step 105 described above, with the remaining data acquired at step 109 described above. Accordingly, the second unit command signal RC(2) is acquired in a stated that all data necessary for code analysis is completed.

Accordingly, at subsequent step 111, the CPU 13 performs code analysis on the second unit command signal RC(2) and acquires, for example, ID information and command information.

Then at step 112, the reception unit 11, when having received the third unit command signal RC(3), stores the received third unit command signal RC(3) in the ring buffer 12. Then, the third interrupt signal BQ(3) is output to the CPU 13 upon completion of the storage in the ring buffer 12.

At step 113, the CPU 13, having received the third interrupt signal BQ(3), acquires the third unit command signal RC(3) stored in the ring buffer 12.

Then at step 114, the CPU 13 performs code analysis on the third unit command signal RC(3) and acquires, for example, ID information and command information.

Subsequently at step 115, the CPU 13 checks whether the unit command signals RC(1) to RC(3) have identical contents based on results of the code analysis at the above-described steps (steps 106, 111, and 114).

Then, when the unit command signals RC(1) to RC(3) have identical contents ("Y" at step 115), the CPU 13 proceeds to processing at step 116. The CPU 13 proceeds to processing at step 124 when the CPU 13 determines that the unit command signals do not have identical contents ("N" at step 115).

At step 116, the CPU 13 performs command processing based on the command information acquired through the code analysis, and outputs, for example, a command instruction for door locking and unlocking to the door actuator 18.

Then at step 117, the CPU 13 initializes the counter 16 of the sub signal LP.

The reception unit 11 is maintained in a state (the operational state) that can receive a signal transmitted from the portable device 2, and thus at step 118, the reception unit 11 outputs the interrupt signal BQ to the CPU 13 when having completed the storage of the received signal in the ring buffer 12.

At step 119, the CPU 13, having received the interrupt signal BQ, acquires the received signal stored in the ring buffer 12.

When it takes a time to perform code analysis or to output a command instruction by command processing, the CPU 13 may perform these pieces of processing in parallel to received signal acquisition executed in response to the interrupt signal BQ.

Then, at step 120, the CPU 13 performs code analysis on the received signal acquired at step 119 and checks whether the received signal is the end signal END directed to the own vehicle.

When the CPU 13 determines that the received signal is the end signal END at step 120 ("Y" at step 120), the CPU 13 proceeds to processing at step 124. When the CPU 13 determines that the received signal is not the end signal END but the sub signal LP ("N" at step 120), the CPU 13 proceeds to processing at step 121.

At step 121, the CPU 13 increments a value n of the counter 16 of the sub signal LP. Then at step 122, the CPU 13 checks whether the counter value n has reached the predetermined number N.

When the CPU 13 determines that the counter value n has reached the predetermined number N ("Y" at step 122), the CPU 13 proceeds to processing at step 123. When the CPU 13 determines that the counter value n has not reached the predetermined number N ("N" at step 122), the CPU 13 returns to the processing at step 118.

At step 123, the CPU 13 performs command processing and outputs, to the window actuator 19, a command instruction for driving the window actuator 19 and instructing door window opening and closing.

Then, after the command instruction for driving the window actuator 19 is output, at step 124, the CPU 13 outputs a sleep command to the reception unit 11 without waiting for reception of the end signal END.

Accordingly, the state of the reception unit 11 is changed from the operational state to the sleep state.

Then, at subsequent step 125, the CPU 13 changes the state of the CPU 13 from the operational state to the sleep state, and ends the series of processing based on the signal (wake-up signal WK) transmitted from the portable device 2.

Accordingly, the reception unit 11 and the CPU 13 of the on-vehicle device 10 are maintained in the sleep state until the reception unit 11 activating intermittently in the sleep state receives a signal (wake-up signal WK) newly transmitted from the portable device 2 at step 100 described above.

In the present control process, in a case that the received signal received after the command instruction is output to the door actuator 18 (step 116) is the sub signal LP ("N" at step 120), the CPU 13 increments the number of times (counter value n) of acquisition of the sub signal LP from the ring buffer 12 by one at each acquisition of the sub signal LP (step 121).

Thus, the CPU 13 repeatedly executes the processing from steps 118 to 122 until the number of times (counter value n) of acquisition of the sub signal LP becomes equal to the predetermined number N (step 122).

Then, while the sub signal LP acquired from the ring buffer 12 is accumulated, the received signal acquired from the ring buffer 12 is the end signal END ("Y" at step 120) before the counter value n reaches the predetermined number N, the CPU 13 transitions to the processing at step 124.

In this case, the CPU 13 changes the reception unit 11 from the operational state to the sleep state by outputting a sleep command CS to the reception unit 11 (step 124; see time point t4 in FIG. 2). Thereafter, the CPU 13 changes the state of the CPU 13 from the operational state to the sleep state (step 125), and ends the series of processing based on the signal (wake-up signal WK) transmitted from the portable device 2.

Accordingly, the CPU 13 ends the processing at this stage without outputting a command instruction to the window actuator 19. The time chart illustrated in FIG. 2 corresponds to this case.

Additionally, a command signal directed to any other vehicle, irrespective of the main signal MS and the sub signal LP, arrives at the on-vehicle device 10.

Thus, when the CPU 13 determines that the main signal MS is not directed to the own vehicle through the processing of ID information matching at step 107 described above ("N" at step 107), the CPU 13 proceeds to the processing at step 124.

Figure 7:
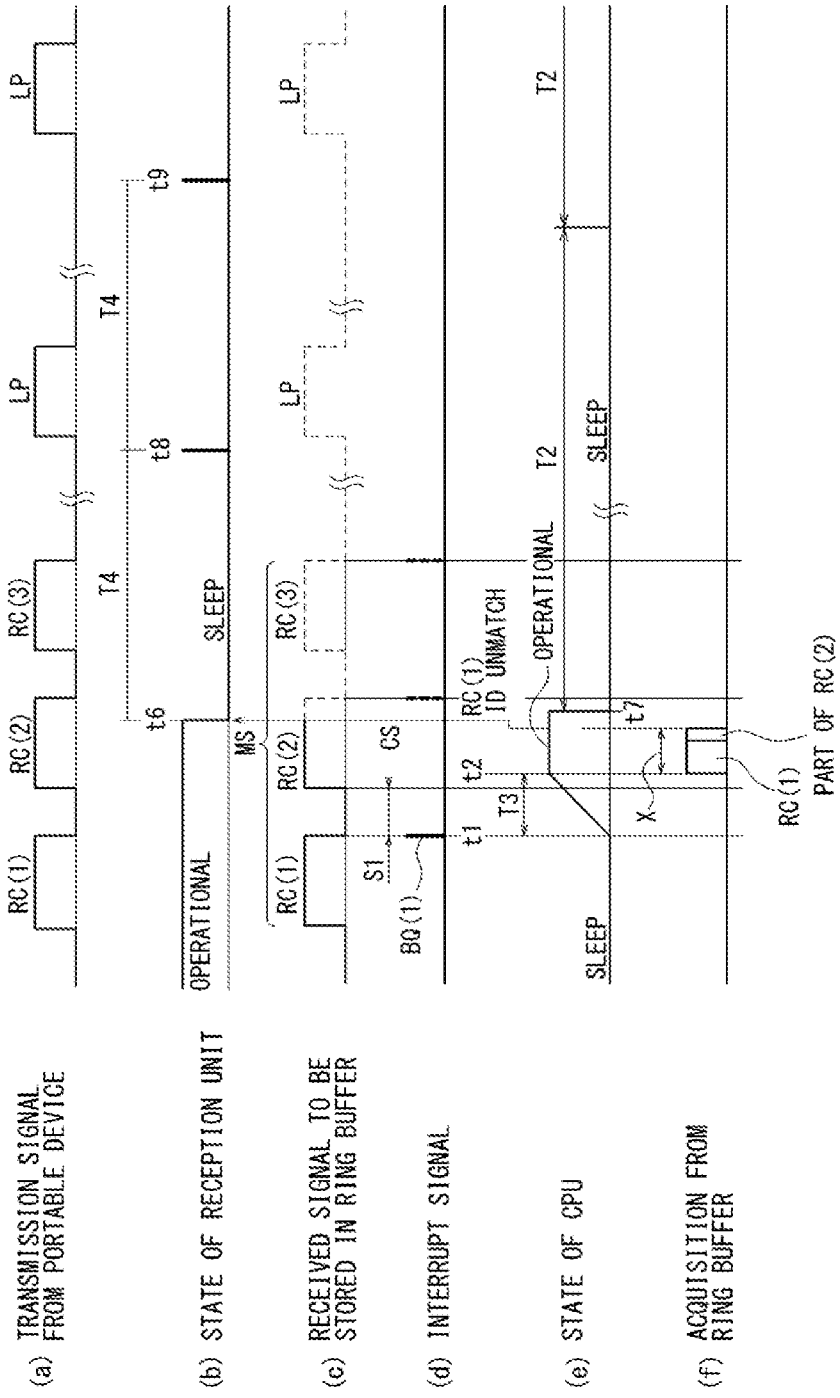
FIG. 7 is a time chart illustrating operation at the on-vehicle device at reception of a signal directed to any other vehicle.

FIG. 7 illustrates a time chart of process flow (steps 107, 124, and 125) when it is determined that the main signal MS is not directed to the own vehicle based on a result of the ID information matching at step 107 ("N" at step 107).

Specifically, when the CPU 13 determines that the main signal MS is not directed to the own vehicle ("N" at step 107), the CPU 13 transmits the sleep command CS to the reception unit 11 at time point t6 before the reception unit 11 receives the sub signal LP(step 124; state transition processing and reception unit control processing). Accordingly, the state of the reception unit 11 transitions from the operational state to the sleep state (power saving state).

The sleep command CS is a command that the CPU 13 makes the reception unit 11 intermittently activated at a timing different from a timing at which the reception unit 11 receives the sub signal LP intermittently transmitted from the portable device 2.

Specifically, the reception unit 11, having been transitioned to the sleep state by the sleep command CS, is intermittently activated at timings of times t8 and t9 illustrated in (b) of FIG. 7. These timings are different from timings of reception of the sub signal LP by the reception unit 11, which are illustrated with dashed lines in (c) of FIG. 7.

Thus, after having received the sleep command CS, the reception unit 11 does not receive the sub signal LP directed to any other vehicle and thus maintains the sleep state.

In the sleep command CS, time period T4 (see (b) of FIG. 7) as an intermittent time length for the intermittent activation of the reception unit 11 is set to be shorter than the time length of the wake-up signal WK (reception unit activation signal) (see (a) of FIG. 1).

As a result, the reception unit 11 does not receive the sub signal LP directed to any other vehicle after having received the sleep command CS. In contrast, when another wake-up signal WK is newly transmitted from the portable device 2, the reception unit 11 receives the wake-up signal WK and reliably transitions (returns) from the sleep state to the operational state.

Then, at time point t7 after time point t6, as illustrated in (e) of FIG. 7, the CPU 13 performs processing of transitioning the state of the CPU 13 from the operational state to the sleep state (step 125; state transition processing).

In this case, the CPU 13 maintains the sleep state because no interrupt signal BQ based on the sub signal LP directed to any other vehicle is input from the reception unit 11.

As described above, according to the present example, the CPU 13 divides the timing of acquisition of the unit command signal RC(2) into the timing of inputting of the first interrupt signal BQ(1) and the timing of inputting of the second interrupt signal BQ(2).

Then, the CPU 13 acquires parts (pieces) of data of the unit command signal RC(2) from the ring buffer 12 at each of the timings and combines the parts to achieve acquisition of the unit command signal RC(2) as having all data necessary for code analysis.

As a result, the CPU 13 can reliably acquire all of the first to third unit command signals RC(1) to RC(3), and perform code analysis on each of the acquired unit command signals RC(1) to RC(3).

With this configuration, the keyless entry system 1 achieves high communication accuracy with added redundancy for the main signal MS and can execute a command corresponding to the operated key button 8 of the portable device 2 at high reliability.

In addition, the keyless entry system 1 can execute another command when the key button 8 is pressed for a long time, which leads to improved convenience.

In addition, the keyless entry system 1 achieves high communication accuracy with added redundancy for the sub signal LP by counting the signal up to the predetermined number N.

Furthermore, the reception unit 11 and the CPU 13 each remains in the sleep state against a command signal directed to any other vehicle.

This configuration avoids a situation that the reception unit 11 outputs the interrupt signal BQ at each time receiving the sub signal LP directed to any other vehicle and the CPU 13 repeats data acquisition from the ring buffer 12 in response to the output interrupt signal.

This processing is performed based on the ID information of the first unit command signal RC(1) in the main signal MS. Thus, the processing is executed at an earliest timing, which leads to maximum reduction of unnecessary power consumption at the reception unit 11 and the CPU 13.

EXAMPLE 2

The following describes the operation of the keyless entry system 1 according to a second example.

Figure 8:
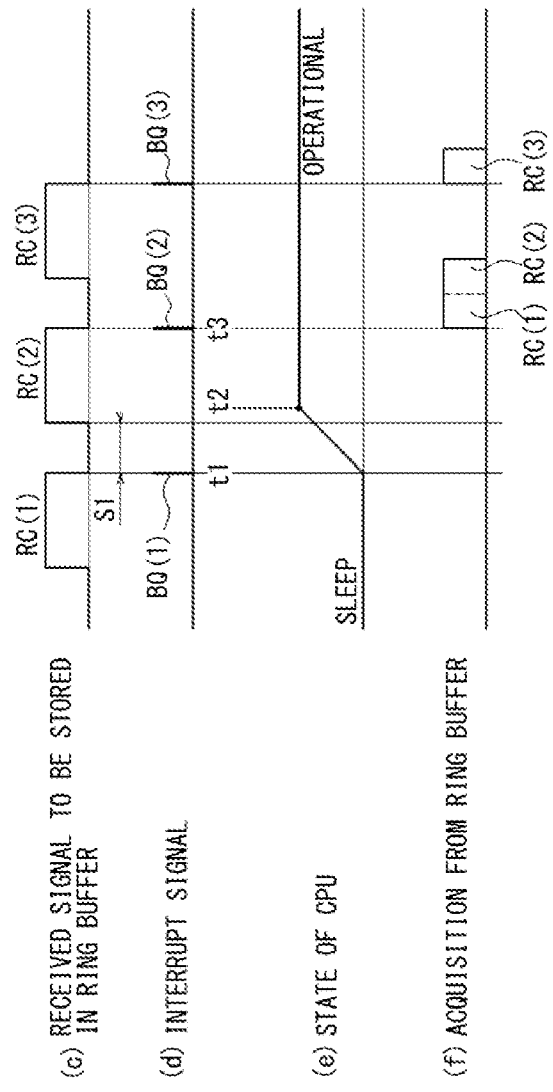
FIG. 8 is a time chart illustrating operation at the on-vehicle device according to a second example.

FIG. 8 is a time chart according to the second example, and corresponds to the above-described time chart illustrated in FIG. 3.

FIG. 8 illustrates, in (c), received signals. FIG. 8 illustrates, in (d), interrupt signals. FIG. 8 illustrates, in (e), state transition of the CPU 13. These (c) to (e) of FIG. 8 are identical to the above-described (c) to (e) of FIG. 3, respectively.

FIG. 8 illustrates, in (f), timings of acquisition from the ring buffer 12 according to the present example.

The second example is different from the above-described first example in acquisition of the main signal MS by the CPU 13 of the on-vehicle device 10.

In the second example, as illustrated in (f) of FIG. 8, when the interrupt signal BQ(1) is input to the CPU 13 upon completion of storage of the first unit command signal RC(1) in the ring buffer 12, the CPU 13 does not acquire received signal from the ring buffer 12 in response to the interrupt signal BQ(1).

Instead, the CPU 13 acquires received signal from the ring buffer 12 for the first time when the second interrupt signal BQ(2) is input from the reception unit 11.

That is, the first unit command signal RC(1) and the second unit command signal RC(2) are already stored in the ring buffer 12 at a timing when the CPU 13 receives the second interrupt signal BQ(2). Thus, data acquired by the CPU 13 after the inputting of the second interrupt signal BQ(2) is combined data of the first unit command signal RC(1) and the second unit command signal RC(2).

The continuous data of the first unit command signal RC(1) and the second unit command signal RC(2) stored in the ring buffer 12 can be all acquired in the acquisition communication time period X.

The CPU 13 identifies and separates the first unit command signal RC(1) and the second unit command signal RC(2) from the combined command signal based on the predetermined data length so that the CPU 13 acquires the signals as the main signals MS independent from each other.

Acquisition of the third unit command signal RC(3) by the CPU 13 is the same as the acquisition processing in the first example.

Figure 9:
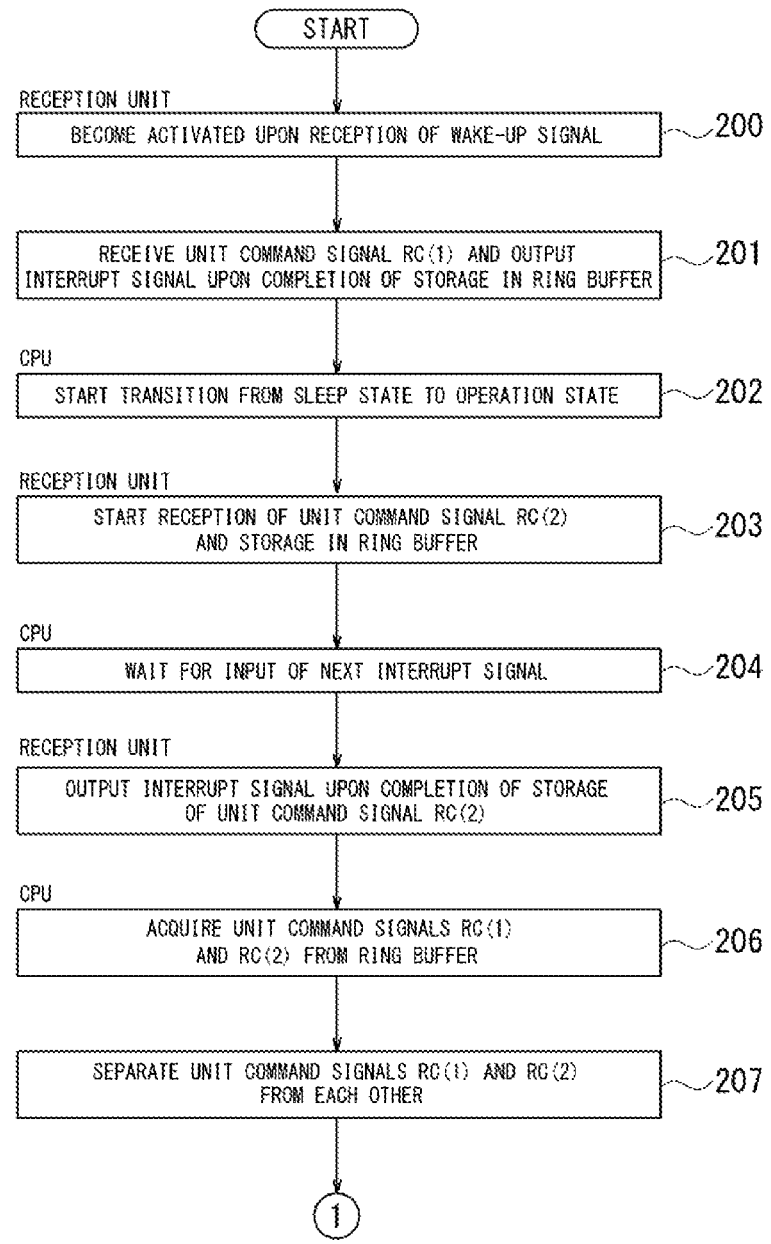
FIG. 9 is a flowchart illustrating process flow at the on-vehicle device according to the second example.
Figure 10:
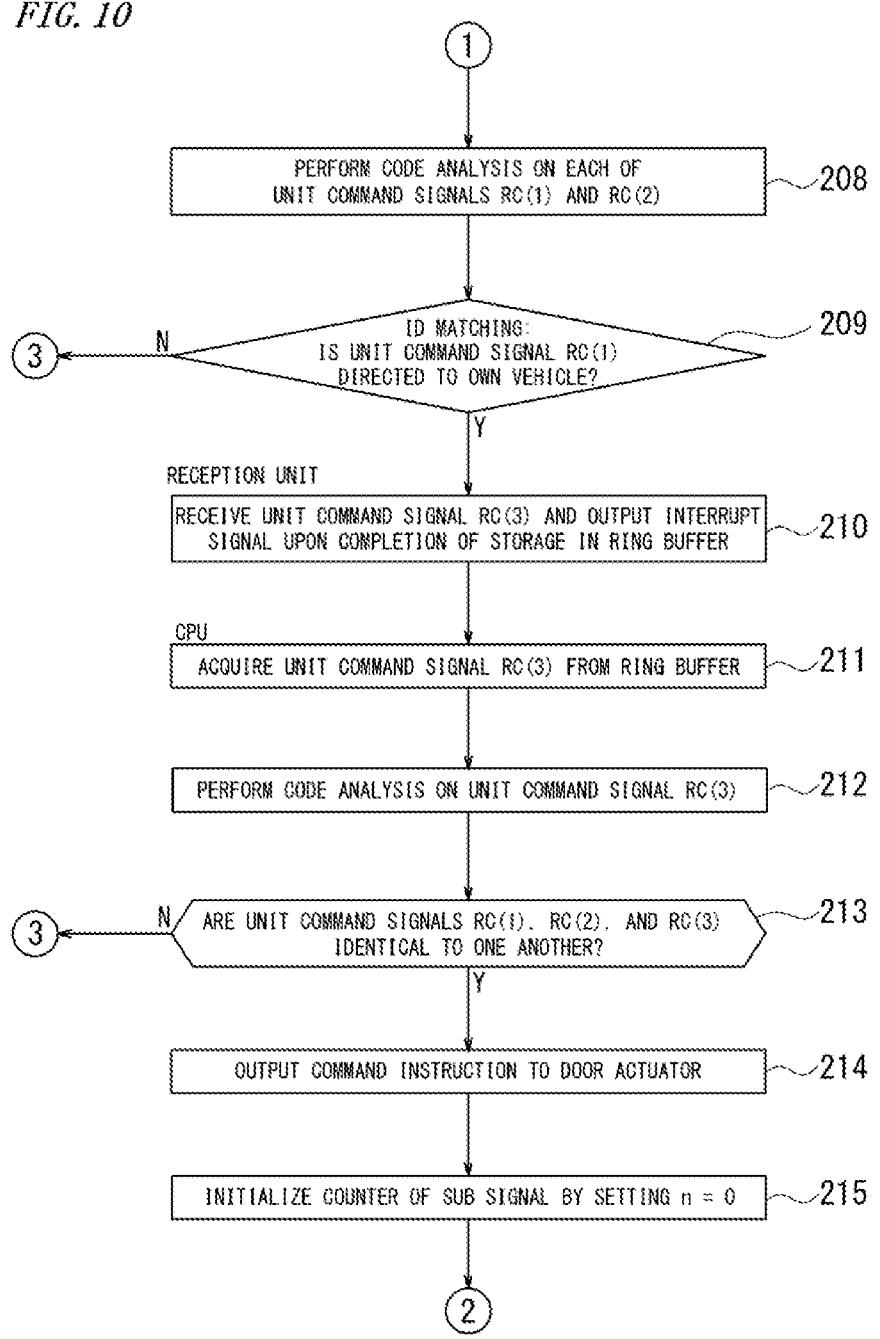
FIG. 10 is a flowchart illustrating the process of the processing at the on-vehicle device according to the second example.
Figure 11:
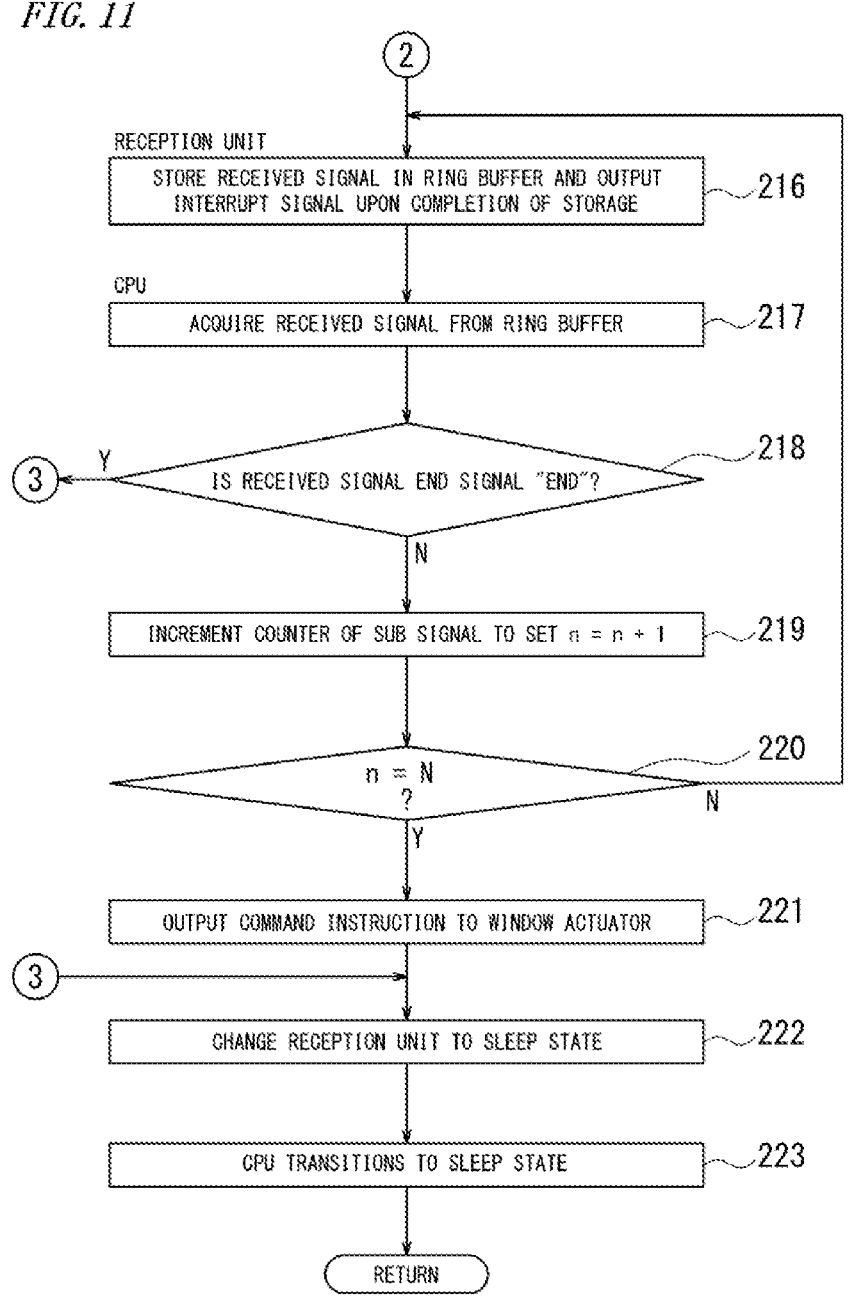
FIG. 11 is a flowchart illustrating the process of the processing at the on-vehicle device according to the second example.

FIGS. 9 to 11 are each a flowchart illustrating process flow according to the second example when the processing is performed at the on-vehicle device 10.

Processing from steps 200 to 203 in FIG. 9 are the same as the processing from steps 100 to 103 in FIG. 4 described above in the first example, respectively.

Once the CPU 13 starts transition from the sleep state to the operational state at step 202, reception of the second unit command signal RC(2) by the reception unit 11 at step 203 is started during the transition delay T3 while the transition to the operational state is started and completed. Then, storage of the received signal in the ring buffer 12 is started.

Then, during the storage of the second unit command signal RC(2) in the ring buffer 12, the CPU 13 completes the transition processing started at step 202 to the operational state. Then, at step 204, the CPU 13 waits until the next (second) interrupt signal BQ(2) is input without performing acquisition from the ring buffer 12.

At step 205, when the reception unit 11 completes the storage of the second unit command signal RC(2) in the ring buffer 12, the reception unit 11 outputs the second interrupt signal BQ(2) to the CPU 13 at time point t3 at which the storage is completed.

At step 206, the CPU 13 receives the second interrupt signal BQ(2) and acquires both of the first unit command signal RC(1) and the second unit command signal RC(2) stored in the ring buffer 12.

The data thus acquired is combined data of the first unit command signal RC(1) and the second unit command signal RC(2).

Thus, at subsequent step 207, the CPU 13 identifies a part of the first unit command signal RC(1) and a part of the second unit command signal RC(2) in the acquired data. Then, the CPU 13 separates the data into the first unit command signal RC(1) and the second unit command signal RC(2).

Then, at step 208 illustrated in FIG. 10, the CPU 13 performs code analysis on each of the first unit command signal RC(1) and the second unit command signal RC(2) and acquires, for example, ID information and command information.

At step 209, the CPU 13 performs, based on a result of the code analysis, matching between the ID information acquired from the unit command signal RC(1) and ID information stored in the EEPROM 14.

Then, when the CPU 13 determines, as the result of the matching, that the unit command signal RC(1) from which the ID information is acquired is directed to the own vehicle ("Y" at step 209), the CPU 13 proceeds to step 210. When the CPU 13 determines that the unit command signal RC(1) is not directed to the own vehicle ("N" at step 209), the CPU 13 proceeds to step 222.

At step 210, the reception unit 11 receives the third unit command signal RC(3). When the reception unit 11 completes storage of the third unit command signal RC(3) to the ring buffer 12, the reception unit 11 outputs the third interrupt signal BQ(3) to the CPU 13.

The processing from steps 210 to 223 is the same as the processing at steps 112 (refer to FIG. 5) to 125 (refer to FIG. 6) described above in the first example, respectively, and thus description of the processing will be omitted below.

Any other configuration is the same as that in the first example.

As described above, according to the present example, the CPU 13 shifts the timing of acquisition of the unit command signal RC(1) to the timing of inputting of the second interrupt signal BQ(2), and acquires the unit command signal RC(1) and the unit command signal RC(2) together from the ring buffer 12.

Then, the CPU 13 separates the acquired unit command signal RC(1) and the unit command signal RC(2) so that the unit command signal RC(2) is acquired as having all data completed.

As a result, the CPU 13 reliably acquires all of the three unit command signals RC(1) to RC(3) as the main signal MS, and can perform code analysis on each unit command signal.

With this configuration, the keyless entry system 1 achieves high communication accuracy with added redundancy for the main signal MS and can execute a command corresponding to the operated key button 8 of the portable device 2 at high reliability.

In addition, the keyless entry system 1 can execute another command when the key button 8 is pressed for a long time, which leads to improved convenience.

In addition, the keyless entry system 1 achieves high communication accuracy with added redundancy for the sub signal LP by counting the signal up to the predetermined number N.

When it is confirmed that the received unit command signal RC(1) is a command signal directed to any other vehicle at step 209 described above, the reception unit 11 and the CPU 13 become the sleep state (steps 222 and 223).

This configuration avoids a situation that the reception unit 11 outputs the interrupt signal BQ at each time receiving the sub signal LP directed to any other vehicle and the CPU 13 repeats data acquisition from the ring buffer 12 in response to the interrupt signal.

Furthermore, the CPU 13 does not need to perform, after acquisition in response to the second interrupt signal BQ(2), the processing of combining a part of the second unit command signal RC(2) obtained by the first acquisition and the remaining of the second unit command signal RC(2) obtained by the second acquisition. This leads to a control speed faster than that in the first example.

In addition, since the CPU 13 waits while the reception unit is receiving the second unit command signal RC(2), the reception at the reception unit is not encumbered by noise generated by the CPU 13 at acquisition from the ring buffer 12.

EXAMPLE 3

The following describes the operation of the keyless entry system 1 according to a third example.

Figure 12:
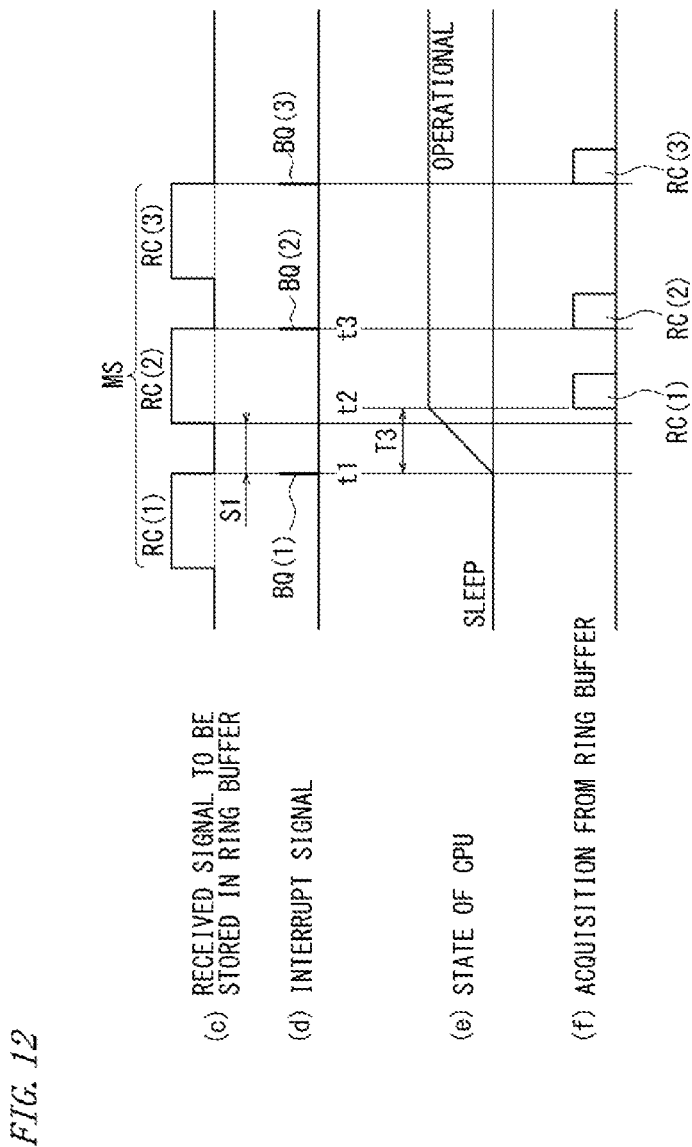
FIG. 12 is a time chart illustrating operation at the on-vehicle device according to a third example.

FIG. 12 is a time chart according to the third example, and corresponds to the above-described time chart illustrated in FIG. 3. FIG. 12 illustrates, in (c), received signals. FIG. 12 illustrates, in (d), interrupt signals. FIG. 12 illustrates, in (e), state transition of the CPU 13. These (c) to (e) of FIG. 8 are identical to the above-described (c) to (e) of FIG. 3, respectively.

FIG. 12 illustrates, in (f), timings of acquisition from the ring buffer 12 according to the present example.

The third example is different from the above-described first and second examples in acquisition of the main signal by the CPU 13 of the on-vehicle device 10.

In the third example, as illustrated in (d) and (e) of FIG. 12, the first interrupt signal BQ(1) is input to the CPU 13 upon completion of storage of the first unit command signal RC(1) in the ring buffer 12 (time point t1). Then, the CPU 13 starts transition from the sleep state to the operational state, and becomes the operational state at time point t2 when the transition delay T3 has elapsed.

Then, after time point t2 at which the transition to the operational state is completed, the CPU 13 is capable of performing data acquisition from the ring buffer 12.

In the first example described above, the CPU 13, having become the operational state after the transition delay T3 has elapsed, starts acquisition of the first unit command signal RC(1) at time point t2 when the CPU becomes the operational state. Thus, within the predetermined acquisition communication time period X starting at time point t2, a part of the second unit command signal RC(2) is received and stored in the ring buffer 12 together with the first unit command signal RC(1).

However, in the third example, as illustrated in (f) of FIG. 12, the CPU 13 performs acquisition as described below at acquisition communication started in response to the first interrupt signal BQ(1). Specifically, the CPU 13 first performs acquisition of the first unit command signal RC(1) only with leaving the second unit command signal RC(2) among unit command signals RC stored in the ring buffer 12.

Then, the CPU 13 acquires complete data of the second unit command signal RC(2) from the ring buffer 12 in response to the second interrupt signal BQ(2) at time point t3 upon completion of the storage of the second unit command signal RC(2) in the ring buffer 12.

The acquisition of the third unit command signal RC(3) by the CPU 13 is achieved by the same processing in the first example.

Figure 13:
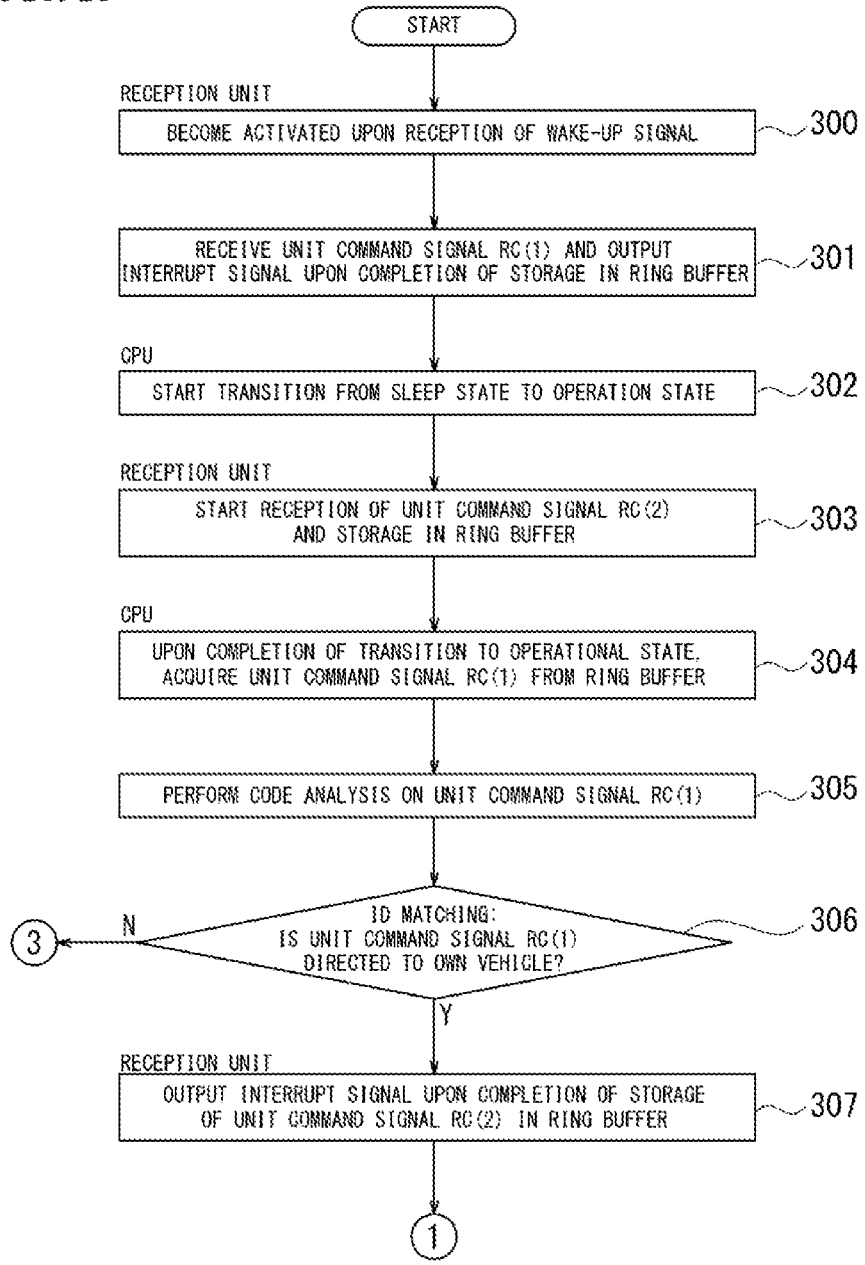
FIG. 13 is a flowchart illustrating process flow at the on-vehicle device according to the third example.
Figure 14:
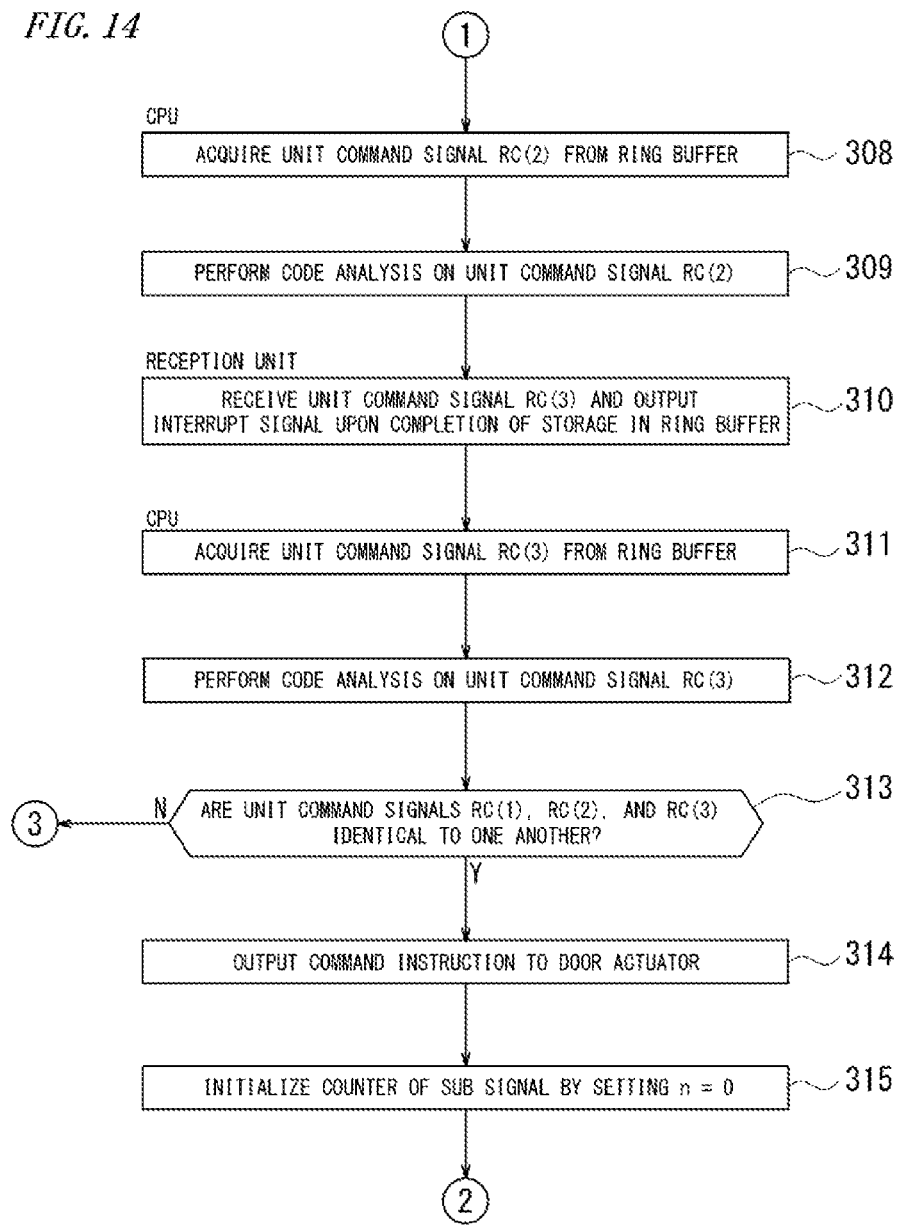
FIG. 14 is a flowchart illustrating the process of the processing at the on-vehicle device according to the third example.
Figure 15:
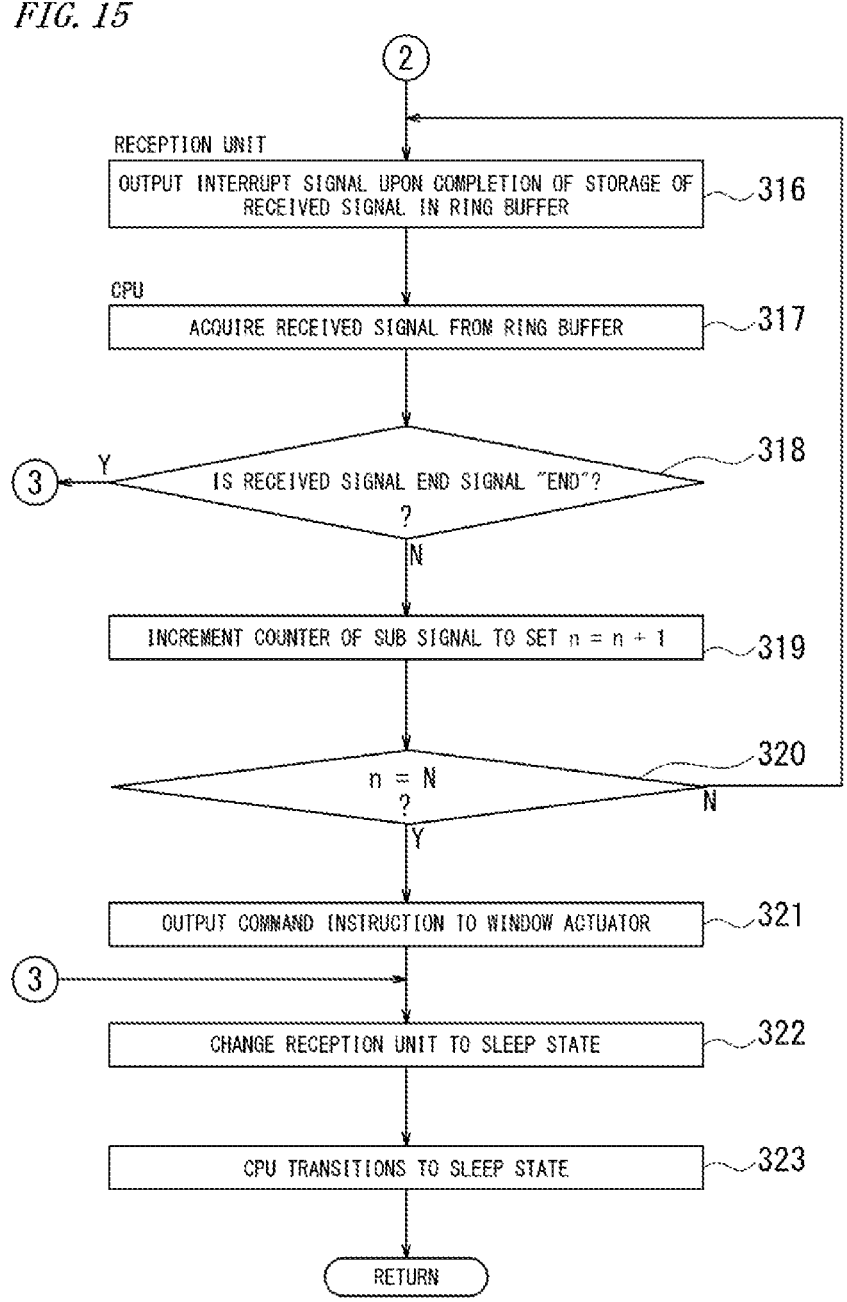
FIG. 15 is a flowchart illustrating the process of the processing at the on-vehicle device according to the third example.

FIGS. 13 to 15 are each a flowchart illustrating process flow according to the third example when the processing is performed at the on-vehicle device 10.

Processing from steps 300 to 303 in FIG. 13 are the same as the processing from steps 100 to 103 in FIG. 4 described above in the first example, respectively.

Once the CPU 13 starts transition from the sleep state to the operational state at step 302, reception of the second unit command signal RC(2) by the reception unit 11 at step 303 is started during the transition delay T3 while the transition to the operational state is started and completed. Then, storage of the received signal in the ring buffer 12 is started.

Then, the CPU 13 completes the transition processing started at step 302 to the operational state during the storage of the second unit command signal RC(2) in the ring buffer 12. Then, at step 304, the CPU 13 only acquires the first unit command signal RC(1) stored in the ring buffer 12.

At a timing (time point t2) when the transition of the CPU 13 to the operational state is completed, the first unit command signal RC(1) as having all data necessary for code analysis and a part of the second unit command signal RC(2) are stored in the ring buffer 12. This part of the second unit command signal RC(2) is incomplete data including not all data necessary for code analysis.

When only the first unit command signal RC(1) is acquired, the CPU 13 performs code analysis on the first unit command signal RC(1) at step 305 and acquires, for example, ID information and command information.

When the code analysis is completed, at step 306, the CPU 13 performs, based on a result of the code analysis, matching between the ID information acquired from the unit command signal RC(1) and ID information stored in the EEPROM 14.

Then, when the CPU 13 determines, based on the result of the matching, that the unit command signal RC(1) from which the ID information is acquired is directed to the own vehicle ("Y" at step 306), the CPU 13 proceeds to step 307. When the CPU 13 determines that the unit command signal RC(1) is not directed to the own vehicle ("N" at step 306), the CPU 13 proceeds to step 322.

At step 307, when the reception unit 12 completes the storage of the second unit command signal RC(2) in the ring buffer 12, the reception unit 11 outputs the second interrupt signal BQ(2) to the CPU 13.

At step 308, having received the second interrupt signal BQ(2), the CPU 13 acquires the second unit command signal RC(2) from the ring buffer 12.

Then at step 309, the CPU 13 performs code analysis on the second unit command signal RC(2) and acquires, for example, ID information and command information.

Then, when having received the third unit command signal RC(3) at step 310, the reception unit 11 stores the received third unit command signal RC(3) in the ring buffer 12. Then, the third interrupt signal BQ(3) is output to the CPU 13 upon completion of the storage in the ring buffer 12.

The processing from steps 310 to 323 is the same as the processing from steps 112 (see FIG. 5) to 125 (see FIG. 6) described above in the first example, respectively, and thus description of the processing will be omitted below.

As described above, according to the present example, the CPU 13 adjusts the amount of data to acquire from the ring buffer 12 between the timing of inputting of the first interrupt signal BQ(1) and the timing of inputting of the second interrupt signal BQ(2). Specifically, the CPU 13 acquires only data of the unit command signal RC(1) from the ring buffer 12 at the timing of inputting of the first interrupt signal BQ(1). Then, at the timing of inputting of the second interrupt signal BQ(2), the CPU 13 acquires data of the unit command signal RC(2) from the ring buffer 12. Accordingly, the CPU 13 achieves acquisition of the unit command signal RC(2) as having all data completed. As a result, the CPU 13 reliably acquires the three unit command signals RC(1) to RC(3) all as the main signal MS, and can perform code analysis on each unit command signal.

With this configuration, the keyless entry system 1 achieves high communication accuracy with added redundancy for the main signal MS and can execute a command corresponding to the operated key button 8 of the portable device 2 at high reliability.

In addition, the keyless entry system 1 can execute another command when the key button 8 is pressed for a long time, which leads to improved convenience.

In addition, the keyless entry system 1 achieves high communication accuracy with added redundancy for the sub signal LP by counting the signal up to the predetermined number N.

When it is confirmed that the received unit command signal RC(1) is a command signal directed to any other vehicle at step 306 described above, the reception unit 11 and the CPU 13 become the sleep state (steps 322 and 323).

This configuration avoids a situation that the reception unit 11 outputs the interrupt signal BQ at each time receiving the sub signal LP directed to any other vehicle and the CPU 13 repeats data acquisition from the ring buffer 12 in response to the interrupt signal.

The processing is performed based on the ID information of the first unit command signal RC(1) in the main signal MS. Thus, the processing is executed at an earliest timing, which leads to maximum reduction of unnecessary power consumption at the reception unit 11 and the CPU 13.

Furthermore, the CPU 13 does not need to perform, after acquisition in response to the second interrupt signal BQ(2), the processing of combining a part of the second unit command signal RC(2) obtained by the first acquisition and the remaining of the second unit command signal RC(2) obtained by the second acquisition. This leads to a control speed faster than that in the first example.

In the present embodiment, the door actuator 18 corresponds to an on-vehicle component in the invention. The CPU 3 corresponds to a portable-side control unit in the present invention according to claims 1 to 5. The CPU 13 corresponds to an on-vehicle-side control unit in the present invention according to claims 1 to 5.

The CPU 13 also corresponds to a control unit in the present invention according to claims 6 to 13.

The first unit command signal RC(1) corresponds to a first unit command signal in the invention, and the second unit command signal RC(2) corresponds to a next unit command signal in the invention.

Especially in the first example, the functional configuration of the CU 13 executing the processing at steps 102, 104, 105, 109, and 110 in the flowcharts illustrated in FIGS. 4 and 5 serves as a signal acquisition processing unit in the present invention according to claims 1, 2, 6, and 7.

In the second example, the functional configuration of the CPU executing the processing at steps 202, 204, 206, and 207 in the flowchart illustrated in FIG. 9 serves as a signal acquisition processing unit in the present invention according to claims 1, 3, and 8.

In the third example, the functional configuration of the CPU executing the processing at steps 302, 304, and 308 in the flowchart illustrated in FIG. 13 serves as a signal acquisition processing unit in the present invention according to claims 1, 4, and 9.

The embodiment is configured as described above. As described in the first example:

(1) In the keyless entry system 1 that receives the three unit command signals RC(1) to RC(3) transmitted from the portable device 2 with the time interval Si in accordance with an operation made on the key button 8 and in which the on-vehicle device 10 controls the door actuator 18, the on-vehicle device 10 includes the reception unit 11 including the ring buffer 12, and the CPU 13, the reception unit 11 receives a unit command signal RC, stores the received unit command signal RC in the ring buffer 12 in the order of the reception, and outputs the interrupt signal BQ to the CPU 13 of the on-vehicle device 10 at each time when the reception unit completes storage of the received unit command signal RC in the ring buffer 12, the CPU 13 transitions from the sleep state to the operational state when the first unit command signal RC(1) that is a first unit command signal received by the reception unit 11 is stored in the ring buffer 12 and the first interrupt signal BQ(1) is input from the reception unit 11, when the CPU 13 is transitioned to the operational state and in a case that the ring buffer 12 stores the first unit command signal RC(1) and a part of the second unit command signal RC(2) that is the unit command signal as received by the reception unit 11 subsequent to the first unit command signal RC(1), the CPU 13:

acquires the first unit command signal RC(1) and the part of the second unit command signal RC(2), and then separates the first unit command signal RC(1) and the part of the second unit command signal RC(2) from each other; and acquires the remaining of the second unit command signal RC(2) stored in the ring buffer 12 when the second unit command signal RC(2) is entirely stored in the ring buffer 12 and the second interrupt signal BQ(2) is input from the reception unit 11, and combines the part of the second unit command signal RC(2) and the remaining of the second unit command signal RC(2) so that the second unit command signal RC(2) is acquired in a state that all data is completed.

When the interrupt signal BQ instructing acquisition of a unit command signal RC stored in the ring buffer 12 is input, the CPU 13 of the on-vehicle device 10 acquires the unit command signal RC stored in the ring buffer 12.

When the first interrupt signal BQ(1) is input, the CPU 13 starts transition from the sleep state to the operational state, and becomes capable of acquiring the unit command signal RC from the ring buffer 12 when the transition to the operational state is completed.

Thus, in a case that the transmission interval (time interval S1) of unit command signals RC that are transmitted from the transmission unit 7 at a plurality of times by operating the key button 8 is shorter than the time of the transition delay T3 taken for the transition of the CPU 13 from the sleep state to the operational state, the second unit command signal RC(2) is received during the transition of the CPU 13 to the operational state. As a result, storage of the received second unit command signal RC(2) in the ring buffer 12 is started.

In such a case, the first unit command signal RC(1) and a part of the second unit command signal RC(2) are stored in the ring buffer 12 when the transition of the CPU 13 to the operational state is completed.

Thus, as described above, the CPU 13 acquires the first unit command signal RC(1) and the part of the second unit command signal RC(2), and then separates the first unit command signal RC(1) and the part of the second unit command signal RC(2) from each other.

When the second unit command signal RC(2) is entirely stored in the ring buffer 12 and the second interrupt signal BQ(2) is input from the reception unit 11, the CPU 13 acquires the remaining of the second unit command signal RC(2) stored in the ring buffer 12. Then, the CPU 13 combines the part of the second unit command signal RC(2) and the remaining of the second unit command signal RC(2) so that the second unit command signal RC(2) is acquired in a state that all data is completed.

Accordingly, the first unit command signal RC(1) and the second unit command signal RC(2) are each acquired without division or the like in a state that all data necessary for code analysis is completed.

Thus, a total of three of the unit command signals RC(1) to RC(3), including the third unit command signal RC(3) acquired subsequently, are each acquired in a state that all data necessary for code analysis is completed, which leads to high communication accuracy.

As described in the second example:

(2) when the CPU 13 is transitioned to the operational state and in a case that the ring buffer 12 stores the first unit command signal RC(1) stored in the ring buffer 12 and a part of the second unit command signal RC(2) that is a unit command signal as received by the reception unit 11 subsequent to the first unit command signal RC(1), the CPU 13 waits until the second unit command signal RC(2) is entirely stored in the ring buffer 12 and the second interrupt signal BQ(2) is input from the reception unit 11, and then acquires the first unit command signal RC(1) and the second unit command signal RC(2) from the ring buffer 12, and separates the first unit command signal RC(1) and the second unit command signal RC(2) from each other, so that the first unit command signal RC(1) and the second unit command signal RC(2) are each acquired in a state that all data is completed.

Accordingly, the first unit command signal RC(1) and the second unit command signal RC(2) are each acquired without division or the like in a state that all data necessary for code analysis is completed.

Thus, a total of three of the unit command signals RC(1) to RC(3), including the third unit command signal RC(3) acquired subsequently, are each acquired in a state that all data necessary for code analysis is completed, which leads to high communication accuracy.

Since the CPU 13 waits while the reception unit 11 is receiving the second unit command signal RC(2), the reception at the reception unit is not encumbered by noise generated by the CPU 13 at acquisition from the ring buffer 12.

As described in the third example:

(3) when the CPU 13 is transitioned to the operational state and in a case that the ring buffer 12 stores the first unit command signal RC(1) and a part of the second unit command signal RC(2) that is the unit command signal received by the reception unit 11 subsequent to the first unit command signal RC(1), the CPU 13 waits until the second unit command signal RC(2) is entirely stored in the ring buffer 12 and the second interrupt signal BQ(2) is input from the reception unit 11 and acquires the second unit command signal RC(2) stored in the ring buffer 12, so that the first unit command signal RC(1) and the second unit command signal RC(2) are each acquired in a state that all data is completed.

Accordingly, the first unit command signal RC(1) and the second unit command signal RC(2) are each acquired without division or the like in a state that all data necessary for code analysis is completed.

Thus, a total of three of the unit command signals RC(1) to RC(3), including the third unit command signal RC(3) acquired subsequently, are each acquired in a state that all data necessary for code analysis is completed, which leads to high communication accuracy.

Furthermore, the CPU 13 does not need to perform, after acquisition in response to the second interrupt signal BQ(2), the processing of combining the part of the second unit command signal RC(2) obtained by the first acquisition and the remaining of the second unit command signal RC(2) obtained by the second acquisition. This leads to a control speed faster than that in the first example.

In each of the first to third examples:

(4) The transmission interval (time interval S1) of unit command signals RC transmitted from the transmission unit 7 of the portable device 2 a plurality of times is shorter than the time of the transition delay T3 taken for the transition of the CPU 13 from the sleep state to the operational state.

Accordingly, it is not needed to increase the transmission interval (time interval S1) of unit command signals RC with taken into account the time of the transition delay T3. Thus, it is possible to swiftly perform code analysis and generate a command instruction based on a result of the code analysis without causing excess delay in acquisition of each unit command signal RC.

The embodiment describes the exemplary keyless entry system in which a command target is mainly door locking and unlocking, but the command target is not limited thereto and may be optional control such as engine starting and stopping.

The special operation of the portable device 2 is not limited to long press of the key button 8, but may be achieved in any optional aspect involving, for example, a plurality of times of discontinuous operations.

The command target through the special operation is not limited to door window opening and closing.

In the embodiment, the on-vehicle device 10 can execute door locking and unlocking as a main command target in response to the main signal MS, and also execute door window opening and closing as another command target in response to the sub signal LP.

However, the processing of sleeping the reception unit 11 and the CPU 13 in response to the main signal MS not directed to the own vehicle is effective also when, at a certain vehicle, the on-vehicle device 10 does not execute another command based on the sub signal LP. This configuration avoids repeated operation of the reception unit 11 and the CPU 13 at each arrival of the sub signal LP directed to any other vehicle.

In the examples, code analysis is performed on each unit command signal RC at acquisition thereof, but may be collectively performed on the three unit command signals of the main signal MS after all unit command signals are acquired.

The main signal MS includes the three unit command signals RC(1) to RC(3) to add redundancy, but is not limited thereto. The number of unit command signals may be any optional number equal to two or larger.

REFERENCE SIGNS LIST 1 keyless entry system
2 portable device
3 CPU
4 operation unit
5 EEPROM
6 RAM
7 transmission unit
8 key button
8a lock button
8b unlock button
10 on-vehicle device
11 reception unit
12 ring buffer
13 CPU
14 EEPROM
15 RAM
16 counter
18 door actuator
19 window actuator
BQ interrupt signal
CS sleep command
END end signal
MS main signal
LP sub signal
RC unit command signal
WK wake-up signal

What is claimed is:

1. A vehicle keyless system comprising:
a portable device configured to transmit a command signal; and
an on-vehicle device configured to receive the command signal transmitted from the portable device and control an on-vehicle component in response to the command signal as received, wherein
the portable device includes an operation unit, a portable-side control unit, and a transmission unit,
the portable-side control unit controls the transmission unit to transmit, at a predetermined time interval, a unit command signal as the command signal in accordance with an operation made on the operation unit, the on-vehicle device includes a reception unit including a ring buffer, and an on-vehicle-side control unit, the reception unit receives the unit command signal, stores received unit command signals in the ring buffer in an order of reception, and outputs an interrupt signal to the on-vehicle-side control unit at each time when the reception unit completes storage of the received unit command signal in the ring buffer, the on-vehicle-side control unit acquires, when the interrupt signal is input, the unit command signal from the ring buffer, and executes command processing for controlling the on-vehicle component based on the unit command signal as acquired, and the on-vehicle-side control unit includes a signal acquisition processing unit configured to control an execution timing of acquisition and an amount of acquisition when the on-vehicle-side control unit acquires a target unit command from the ring buffer and in a case that the ring buffer stores at least a part of a unit command signal as received by the reception unit subsequent to the target unit command , so that the unit command signal as received subsequent to the target unit command signal is acquired in a state that all data is completed.

2. The vehicle keyless system according to claim 1, wherein the on-vehicle-side control unit transitions from a sleep state to an operational state when a first unit command signal that is the unit command signal received by the reception unit for first time is stored in the ring buffer and a first interrupt signal is input from the reception unit, and when transitioned to the operational state and in a case that the ring buffer stores the first unit command signal and a part of a next unit command signal that is the unit command signal as received by the reception unit subsequent to the first unit command signal, the signal acquisition processing unit:

acquires the first unit command signal and the part of the next unit command signal, and then separates the first unit command signal and the part of the next unit command signal from each other; and acquires, when the next unit command signal is entirely stored in the ring buffer and a second interrupt signal is input from the reception unit, a remaining of the next unit command signal stored in the ring buffer and combines the part of the next unit command signal and the remaining of the next unit command signal.

3. The vehicle keyless system according to claim 1, wherein the on-vehicle-side control unit transitions from a sleep state to an operational state when a first unit command signal that is the unit command signal as received by the reception unit for first time is stored in the ring buffer and a first interrupt signal is input from the reception unit, and when transitioned to the operational state and in a case that the ring buffer stores the first unit command signal and a part of a next unit command signal that is the unit command signal as received by the reception unit subsequent to the first unit command signal, the signal acquisition processing unit waits until the next unit command signal is entirely stored in the ring buffer and a second interrupt signal is input from the reception unit, and then acquires the first unit command signal and the next unit command signal from the ring buffer and separates the first unit command signal and the next unit command signal from each other.

4. The vehicle keyless system according to claim 1, wherein the on-vehicle-side control unit transitions from a sleep state to an operational state when a first unit command signal that is the unit command signal received by the reception unit for first time is stored in the ring buffer and a first interrupt signal is input from the reception unit, and when transitioned to the operational state and in a case that the ring buffer stores the first unit command signal and a part of a next unit command signal that is the unit command signal received by the reception unit subsequent to the first unit command signal, the signal acquisition processing unit:

acquires the first unit command signal stored in the ring buffer; and then waits until the next unit command signal is entirely stored in the ring buffer and a second interrupt signal is input from the reception unit, and acquires the next unit command signal stored in the ring buffer.

5. The vehicle keyless system according to claim 1, wherein the predetermined time interval as a transmission interval of the unit command signal transmitted from the portable device is shorter than a time taken for state transition of the on-vehicle-side control unit from a sleep state to an operational state.

6. An on-vehicle device of a vehicle keyless system configured to receive a unit command signal transmitted from a portable device at a predetermined time interval and control an on-vehicle component, the on-vehicle device comprising:

a reception unit including a ring buffer; and a control unit, wherein the reception unit receives the unit command signal, stores received unit command signals in the ring buffer in an order of reception, and outputs an interrupt signal to the control unit at each time when the reception unit completes storage of the received unit command signal in the ring buffer, the control unit acquires, when the interrupt signal is input, the unit command signal from the ring buffer and executes command processing for controlling the on-vehicle component based on the unit command signal as acquired, and the control unit includes a signal acquisition processing unit configured to control an execution timing of acquisition and an amount of acquisition when the control unit acquires a target unit command from the ring buffer and in a case that the ring buffer stores at least a part of a unit command signal as received by the reception unit subsequent to the target unit command signal, so that the unit command signal as received subsequent to the target unit command signal is acquired in a state that all data is completed.

7. he on-vehicle device of the vehicle keyless system according to claim 6, wherein the control unit transitions from a sleep state to an operational state when a first unit command signal that is the unit command signal received by the reception unit for first time is stored in the ring buffer and a first interrupt signal is input from the reception unit, and when transitioned to the operational state and in a case that the ring buffer stores the first unit command signal and a part of a next unit command signal that is the unit command signal as received by the reception unit subsequent to the first unit command signal, the signal acquisition processing unit:
acquires the first unit command signal and the part of the next unit command signal, and then separates the first unit command signal and the part of the next unit command signal from each other, and
acquires, when the next unit command signal is entirely stored in the ring buffer and a second interrupt signal is input from the reception unit, a remaining of the next unit command signal stored in the ring buffer and combines the part of the next unit command signal and the remaining of the next unit command signal.

8. The on-vehicle device of the vehicle keyless system according to claim 6, wherein
the control unit transitions from a sleep state to an operational state when a first unit command signal that is the unit command signal as received by the reception unit for first time is stored in the ring buffer and a first interrupt signal is input from the reception unit, and
when transitioned to the operational state and in a case that the ring buffer stores the first unit command signal stored in the ring buffer and part of a next unit command signal that is the unit command signal as received by the reception unit subsequent to the first unit command signal, the signal acquisition processing unit waits until the next unit command signal is entirely stored in the ring buffer and a second interrupt signal is input from the reception unit, and then acquires the first unit command signal and the next unit command signal from the ring buffer, and separates the first unit command signal and the next unit command signal from each other.

9. The on-vehicle device of the vehicle keyless system according to claim 6, wherein
the control unit transitions from a sleep state to an operational state when a first unit command signal that is the unit command signal as received by the reception unit for first time is stored in the ring buffer and a first interrupt signal is input from the reception unit, and
when transitioned to the operational state and in a case that the ring buffers stores the first unit command signal and a part of a next unit command signal that is the unit command signal received by the reception unit subsequent to the first unit command signal, the signal acquisition processing unit:
acquires the first unit command signal stored in the ring buffer; and then
waits until the next unit command signal is entirely stored in the ring buffer and a second interrupt signal is input from the reception unit, and acquires the next unit command signal stored in the ring buffer.

10. The vehicle keyless system according to claim 2, wherein the predetermined time interval as a transmission interval of the unit command signal transmitted from the portable device is shorter than a time taken for state transition of the on-vehicle-side control unit from a sleep state to an operational state.

11. The vehicle keyless system according to claim 3, wherein the predetermined time interval as a transmission interval of the unit command signal transmitted from the portable device is shorter than a time taken for state transition of the on-vehicle-side control unit from a sleep state to an operational state.

12. The vehicle keyless system according to claim 4, wherein the predetermined time interval as a transmission interval of the unit command signal transmitted from the portable device is shorter than a time taken for state transition of the on-vehicle-side control unit from a sleep state to an operational state.

* * * * *